United States Patent
Sundberg et al.

(10) Patent No.: US 10,397,839 B2
(45) Date of Patent: Aug. 27, 2019

(54) APPARATUS AND METHOD FOR IMPROVING HANDOVER IN A GLOBAL SYSTEM FOR MOBILE COMMUNICATIONS

(71) Applicant: Telefonaktiebolaget L M Ericsson (publ), Stockholm (SE)

(72) Inventors: Mårten Sundberg, Årsta (SE); Stefan Eriksson Löwenmark, Färentuna (SE); Miguel Lopez, Solna (SE); Paul Schliwa-Bertling, Ljungsbro (SE)

(73) Assignee: Telefonaktiebolaget LM Ericsson ( publ), Stockholm (SE)

( * ) Notice: Subject to any disclaimer, the term of this patent is extended or adjusted under 35 U.S.C. 154(b) by 240 days.

(21) Appl. No.: 14/911,165

(22) PCT Filed: Jan. 23, 2014

(86) PCT No.: PCT/SE2014/050084
§ 371 (c)(1),
(2) Date: Feb. 9, 2016

(87) PCT Pub. No.: WO2015/020581
PCT Pub. Date: Feb. 12, 2015

(65) Prior Publication Data
US 2016/0198375 A1 Jul. 7, 2016

Related U.S. Application Data

(60) Provisional application No. 61/864,001, filed on Aug. 9, 2013.

(51) Int. Cl.
*H04W 36/36* (2009.01)
*H04W 36/08* (2009.01)
(Continued)

(52) U.S. Cl.
CPC ........... *H04W 36/08* (2013.01); *H04L 5/1469* (2013.01); *H04W 36/18* (2013.01); *H04W 36/38* (2013.01)

(58) Field of Classification Search
CPC ..... H04W 36/08; H04W 36/38; H04W 36/18; H04L 5/1469
See application file for complete search history.

(56) References Cited

U.S. PATENT DOCUMENTS 5,711,003 A * 1/1998 Dupuy .............. H04W 36/0083
370/331
6,138,020 A 10/2000 Galyas et al.
(Continued)

FOREIGN PATENT DOCUMENTS

CN 1239636 A 12/1999
CN 1376372 A 10/2002
(Continued)

OTHER PUBLICATIONS

3GPP, "3rd Generation Partnership Project; Technical Specification Group Core Network and Terminals; Mobile radio interface Layer 3 specification; Core network protocols; Stage 3 (Release 11)", 3GPP TS 24.008 V11.8.0, Sep. 2013, 1-677.
(Continued)

*Primary Examiner* — Phuc H Tran
(74) *Attorney, Agent, or Firm* — Murphy, Bilak & Homiller, PLLC

(57) ABSTRACT

A method is provided for improving handover in a mobile station configured to operate a time division multiple access, TDMA, protocol in a global system for mobile communications, GSM, telecommunication network. The method comprises the steps of receiving a handover command requesting that the mobile station perform a handover operation from a serving cell to a target cell, and configuring the mobile station to transmit and receive user plane data with (Continued)

the serving cell and the target cell during a time period between receiving the handover command and the handover operation being completed.

19 Claims, 21 Drawing Sheets

(51) Int. Cl.
*H04W 36/18* (2009.01)
*H04L 5/14* (2006.01)
*H04W 36/38* (2009.01)

(56) References Cited

U.S. PATENT DOCUMENTS

| | | | | |
|---|---|---|---|---|
| 6,208,871 | B1* | 3/2001 | Hall | H04J 3/0682 370/335 |
| 6,603,972 | B1* | 8/2003 | Sawyer | H04W 36/0011 455/436 |
| 6,772,112 | B1 | 8/2004 | Ejzak et al. | |
| 7,069,039 | B2* | 6/2006 | Shinozaki | H04W 52/12 455/439 |
| 8,768,362 | B2* | 7/2014 | Shimonabe | H04W 36/0072 455/436 |
| 2002/0016170 | A1* | 2/2002 | Sabat, Jr. | H04W 16/32 455/436 |
| 2002/0094013 | A1* | 7/2002 | Schilling | H04B 1/707 375/130 |
| 2003/0137953 | A1 | 7/2003 | Chae et al. | |
| 2004/0102195 | A1* | 5/2004 | Naghian | H04W 4/02 455/456.1 |
| 2006/0003767 | A1* | 1/2006 | Kim | H04W 36/18 455/436 |

FOREIGN PATENT DOCUMENTS

| | | |
|---|---|---|
| CN | 1867184 A | 11/2006 |
| CN | 101242643 A | 8/2008 |
| EP | 0922340 A1 | 6/1999 |
| WO | 9809391 A1 | 3/1998 |
| WO | 9815152 A1 | 4/1998 |
| WO | 0124558 A1 | 4/2001 |
| WO | 0239774 A1 | 5/2002 |
| WO | 2010149035 A1 | 12/2010 |

OTHER PUBLICATIONS

3GPP, "3rd Generation Partnership Project; Technical Specification Group GSM/EDGE Radio Access Network; General Packet Radio Service (GPRS); Mobile Station (MS)—Base Station System (BSS) interface; Radio Link Control / Medium Access Control (RLC/MAC) protocol", 3GPP TS 44.060 V11.6.0, Sep. 2013, 1-630.

3GPP, "3rd Generation Partnership Project; Technical Specification Group GSM/EDGE Radio Access Network; Mobile radio interface layer 3 specification; Radio Resource Control (RRC) protocol (Release 11)", 3GPP TS 44.018 V11.6.0, Sep. 2013, 1-467.

3GPP, "3rd Generation Partnership Project; Technical Specification Group GSM/EDGE Radio Access Network; Multiplexing and multiple access on the radio path (Release 11)", 3GPP TS 45.002 V11.3.0, Aug. 2013, 1-113.

3GPP, "3rd Generation Partnership Project; Technical Specification Group GSM/EDGE Radio Access Network; Packet-switched handover for GERAN A/Gb mode; Stage 2 (Release 11)", 3GPP TS 43.129 V11.1.0, Nov. 2013, 1-95.

3GPP, "3rd Generation Partnership Project; Technical Specification Group GSM/EDGE Radio Access Network; Radio subsystem link control (Release 11)", 3GPP TS 45.008 V11.5.0, Aug. 2013, 1-150.

3GPP, "3rd Generation Partnership Project; Technical Specification Group GSM/EDGE Radio Access Network; Radio subsystem synchronization (Release 11)", 3GPP TS 45.010 V11.1.0, Nov. 2012, 1-32.

* cited by examiner

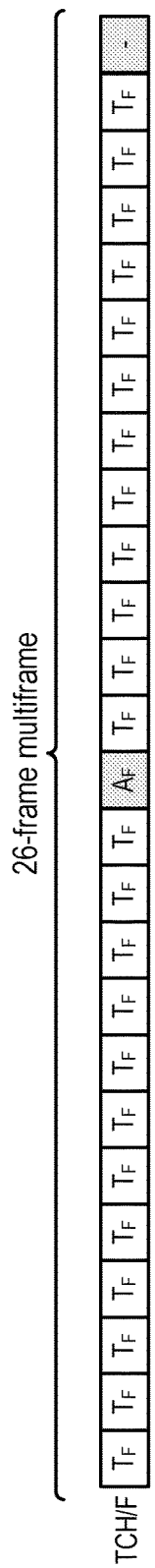
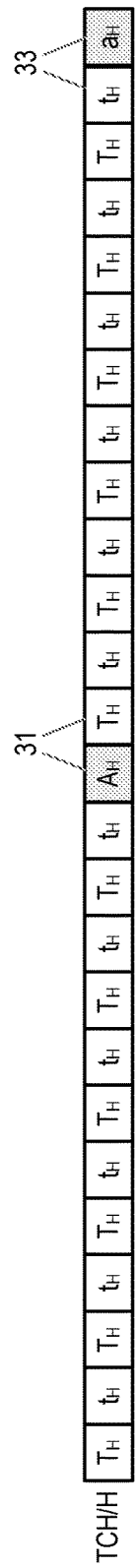
Figure 3a
Figure 3b

APPARATUS AND METHOD FOR IMPROVING HANDOVER IN A GLOBAL SYSTEM FOR MOBILE COMMUNICATIONS

TECHNICAL FIELD

The present invention relates to an apparatus and method for improving handover in a global system for mobile communications, GSM, and in particular to an apparatus and method for reducing interruption times, for example speech interruption times during a handover operation.

BACKGROUND

A handover procedure is an important feature of wireless communication systems that provide mobility, so that users can move in the network without experiencing loss of the connection. For example, in cellular systems the user's connection with the network, and thus through the network with other users (user to user(s) connection), is handed over from one cell to another.

Different handover procedures are defined in the standards relating to GSM, for example as defined in the technical specifications relating to the $3^{rd}$ generation partnership project (3GPP), including 3GPP TS 44.018 (relating to Mobile radio interface layer 3 specification; Radio Resource Control (RRC) protocol, Release 11, version 11.6.0), 3GPP TS 44.060 (relating to GPRS Mobile Station to Base Station interface; Radio Link Control/Medium Access Control (RLC/MAC) protocol, Release 11, version 11.6.0), 3GPP TS 43.129 (relating to Packet-switched handover for GSM Edge Radio Access Network, GERAN, Release 11, version 11.1.0), and 3GPP TS 45.010 (relating to Radio subsystem synchronization, Release 11, version 11.1.0).

A common feature to all these handover procedures is that they will interrupt the user plane data transfer due to data transmission opportunities being stolen or replaced with control signaling. The interruption time is also impacted by the time to switch channel(s) from a serving base station (or serving cell) to a target base station (or target cell), including the associated control signaling. The overall impact to user experience and network performance will depend on how frequent the handovers are performed, and what type of handover is used.

A disadvantage of the existing solutions for handover operations, is that frame losses will result in a perceived degradation of speech quality, especially if the handovers occur frequently. The frame losses occur when the mobile station disconnects from the channel in the serving cell and connects to the channel in the target cell, and in particular before the transmission/reception of speech frames can be resumed.

SUMMARY

It is an aim of the present invention to provide a method and apparatus which obviate or reduce at least one or more of the disadvantages mentioned above.

According to a first aspect there is provided a method for improving handover in a mobile station configured to operate a time division multiple access, TDMA, protocol in a global system for mobile communications, GSM, telecommunication network. The method comprises the steps of: receiving a handover command requesting that the mobile station perform a handover operation from a serving cell to a target cell; and configuring the mobile station to transmit and receive user plane data with the serving cell and the target cell during a time period between receiving the handover command and the handover operation being completed.

According to another aspect there is provided a mobile station configured to operate a time division multiple access, TDMA, protocol in a global system for mobile communications, GSM, telecommunication network. The mobile station comprises: an interface unit configured to receive a handover command requesting that the mobile station perform a handover operation from a serving cell to a target cell; and a processing unit configured to control transmission and reception of user plane data with the serving cell and the target cell during a time period between receiving the handover command and the handover operation being completed.

According to another aspect there is provided a method in a network node that is configured to operate a time division multiple access, TDMA, protocol in a global system for mobile communications, GSM, telecommunication network. The method comprises the steps of: determining which channel combination, CC, and simultaneous transmission mode, STM, is being used to communicate with a mobile station; determining which network resources are available for the combination of CC and STM; and transmitting a handover signal to a mobile station, requesting that the mobile station perform a handover operation from a serving cell to a target cell, the handover signal containing information relating to the resources to be used during the handover for communicating user plane data, such that the mobile station is configurable to transmit and receive user plane data with the serving cell and the target cell during a time period between the handover signal transmitted from the network node being received by the mobile station and the handover operation being completed.

According to another aspect there is provided a network node configured to operate a time division multiple access, TDMA, protocol in a global system for mobile communications, GSM, telecommunication network. The network node comprises: a processing unit configured to: determine which channel combination, CC, and simultaneous transmission mode, STM, is being used by a mobile station; determine which network resources are available for the combination of CC and STM; and an interface unit configured to transmit a handover signal to a mobile station requesting that the mobile station perform a handover operation from a serving cell to a target cell, the handover signal containing information relating to the resources to be used during the handover for communicating user plane data, such that the mobile station is configurable to transmit and receive user plane data with the serving cell and the target cell during a time period between the handover signal transmitted from the network node being received by the mobile station and the handover operation being completed.

BRIEF DESCRIPTION OF THE DRAWINGS

For a better understanding of examples of the present invention, and to show more clearly how the examples may be carried into effect, reference will now be made, by way of example only, to the following drawings in which:

FIGS. 3a and 3b illustrate the mapping of traffic channels and slow associated control channels (SACCH) onto physical channels in a 26-multiframe;

FIGS. 4a and 4b illustrate the interleaving of speech frames on physical channels in a 26-multiframe;

DETAILED DESCRIPTION

Figure 1:
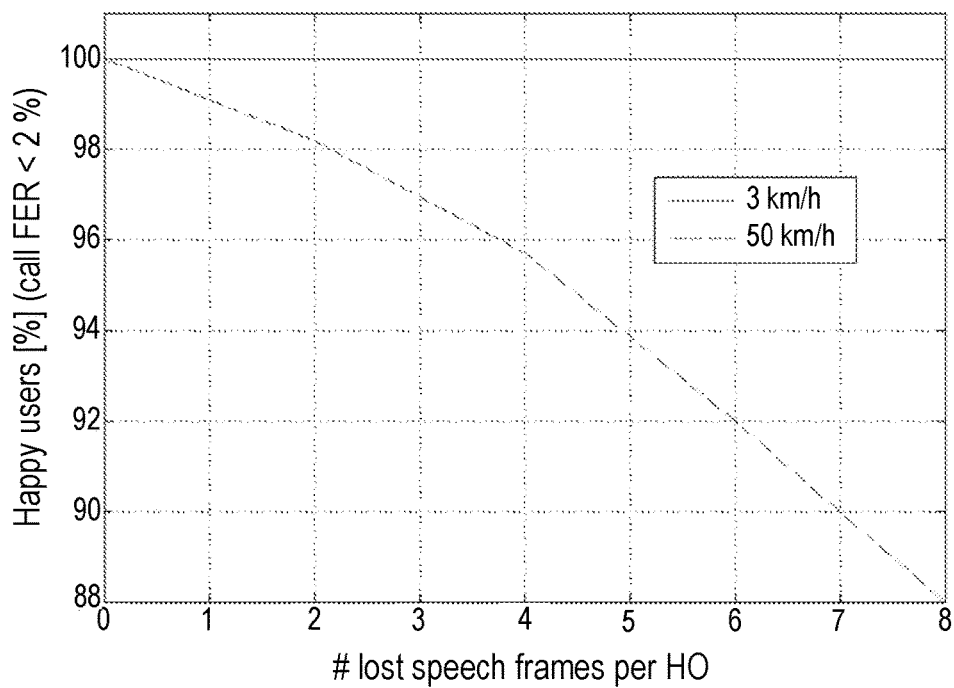
FIG. 1 shows the impact on happy users in a telecommunications system based on different mobile station speeds.

In the case of a handover of an ongoing voice call in a Circuit Switched (CS) domain the impact on speech performance can be estimated by simulating different numbers of lost speech frames in each handover performed (the rate of lost speech frames being referred to as a Frame Erasure Rate (FER)). FIG. 1 shows a simulated estimation of happy users in a system, measured by the FER (whereby call FER <2%). Different assumptions on users moving at different average speeds have been simulated (for example 3 Km/h and 50 Km/h in the example). All simulations have been carried out at the same system load, with all other parameter settings aligned between the simulations.

It can be seen from FIG. 1 that when users are moving in a moderate to high speed (represented by 50 km/h) the number of lost speech frames during a handover operation greatly impacts the overall system performance. The reason for this is the increased number of handovers that need to be performed for each call, and consequently the total FER frames will increase.

In GSM, for circuit switched voice calls the network controls when, and to what cell, a handover is performed. The handover decision is based on information provided by the mobile station to the network during the ongoing call. This information typically contains an estimate of the signal strengths of the neighboring base stations, for example as described in technical specifications 3GPP TS 44.018 and 44.060 mentioned above, or in 3GPP TS 45.008 (relating to Radio subsystem link control, Release 11, version 11.5.0).

Figure 2:
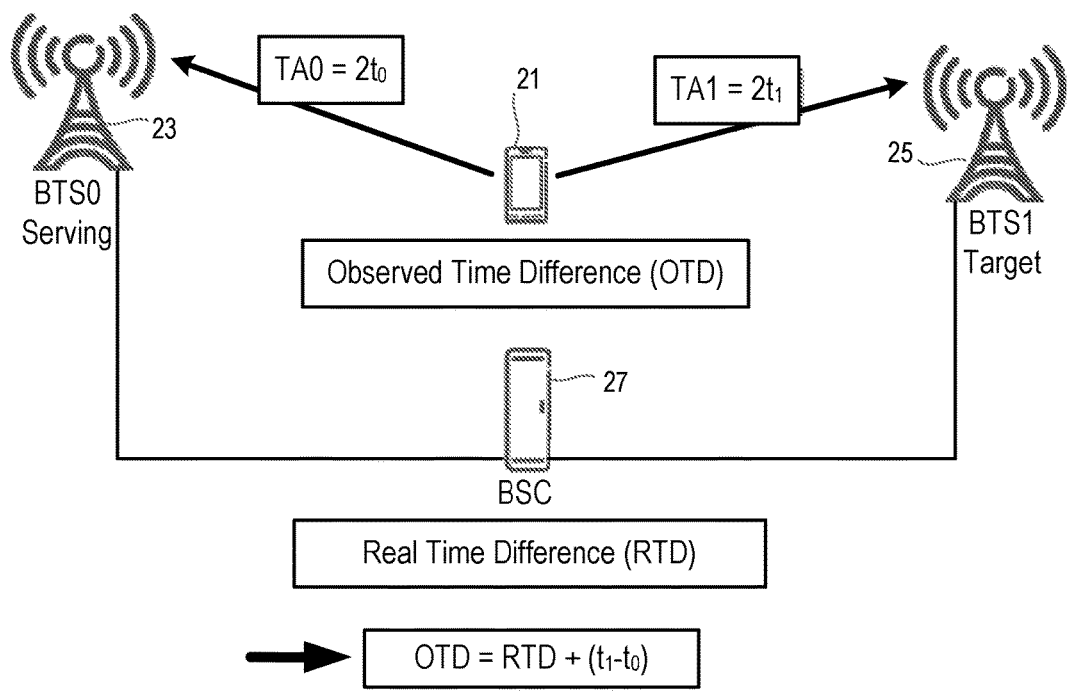
FIG. 2 shows the relationship between different time measurements between a mobile station, serving cell and target cell within a telecommunications system.

In the technical specification relating to GSM standard 3GPP TS 44.018 four different handover procedures are defined; non-synchronized, finely-synchronized, pseudo and pre-synchronized handover. FIG. 2 describes some basic handover principles that are relevant to these four different handover procedures, when a mobile station 21 is performing a handover operation from a serving base station 23 to a target base station 25, under control of a base station controller 27.

Both an Observed Time Difference (OTD) and a Real Time Difference (RTD) shown in FIG. 2 are defined in the existing 3GPP specifications. RTD is the time difference at the network reference point between the serving and target base stations 23 and 25. OTD is the downlink time difference measured by the mobile station 21, using a granularity of 0.5 GSM symbol periods. A timing advance signal (TA) is a compensation for the propagation delay used by the mobile station for uplink transmissions, measured in full GSM symbols. The TA signal compensates for the propagation delay in both a downlink and uplink to align the transmission (TX) and reception (RX) slots at a base station 23, 25. Thus, the relationship between OTD and RTD can be expressed as:

$$OTD=RTD+(t_1-t_0),$$

where $t_0$ relates to the propagation delay to the serving base station, and $t_1$ the propagation delay to the target base station.

The information used in the different handover procedures, before the mobile station 21 switches from the serving base station 23 to the target base station 25 is shown in Table 1 below. It can be noted that the timing advance signal TA0, relating to the timing advance signal in the serving cell (base station 23), is always needed, and consequently the timing advance signal relating to the target cell (TA1) will eventually be communicated to the mobile station 21 after a handover, but is not required before the handover for all procedures, as indicated by Table 1 below (which shows the information used by different handover procedures).

TABLE 1

| Handover procedure | OTD | RTD | TA0 | TA1 |
|---|---|---|---|---|
| Non synchronized | No | No | Yes | No |
| Finely synchronized | No | No | Yes | No |
| Pseudo-synchronized | Yes | Yes | Yes | Calculated by MS before access |
| Pre-synchronized | No | No | Yes | Indicated by network to the MS otherwise default value of 1 is used. |

In GSM, two different operation modes of speech traffic channels (TCH) can be configured, either full rate (FR) or half rate (HR) traffic channels.

Only one time slot (TS) is allocated for speech in both modes of operation but for full rate speech, the time slot is used in all TDMA frames while for half rate speech every other TDMA frame is used. This allows another connection to be assigned the same time slot but on the alternating TDMA frames.

FIGS. 3a and 3b show such a principle of operation for a 26-frame multiframe. The mapping of the traffic channels is identical for all 26-frame multiframes.

FIG. 3a shows a full rate speech traffic channel (TCH/F) having TDMA frames $T_F$, a TDMA frame $A_F$ for slow associated control signaling (SACCH), and an idle frame indicated by "-".

FIG. 3b shows a half rate speech traffic channel (TCH/H) having TDMA frames $T_H$ for sub channel 0, TDMA frames $t_H$ for sub channel 1, TDMA frame $A_H$ for slow associated control signaling (SACCH) relating to sub channel 0, and TDMA frame $a_H$ for slow associated control signaling (SACCH) relating to sub channel 1.

It can be noted that due to the slow associated control signaling there are sometimes two consecutive TDMA frames assigned to the same traffic channel (illustrated by reference 31 in FIG. 3b, showing two consecutive frames $A_H$, $T_H$ relating to sub channel 0, and reference 33 showing two consecutive frames $t_H$, $a_H$ relating to sub channel 1), otherwise the TDMA frames used by the different half rate sub channels are alternating.

During a speech call, one speech frame is transmitted on this physical (full rate or half rate) channel every 20 ms, i.e. six speech frames per 26-multiframe. After channel coding and interleaving, each speech frame is transmitted using half of the available bits of eight consecutive bursts (full rate) or of four alternating bursts (half rate) on the physical (sub-) channel. Typically a diagonal interleaver is used for the speech frames. After interleaving, consecutive speech frames will be partially overlapping.

Figures 4A, 4B:
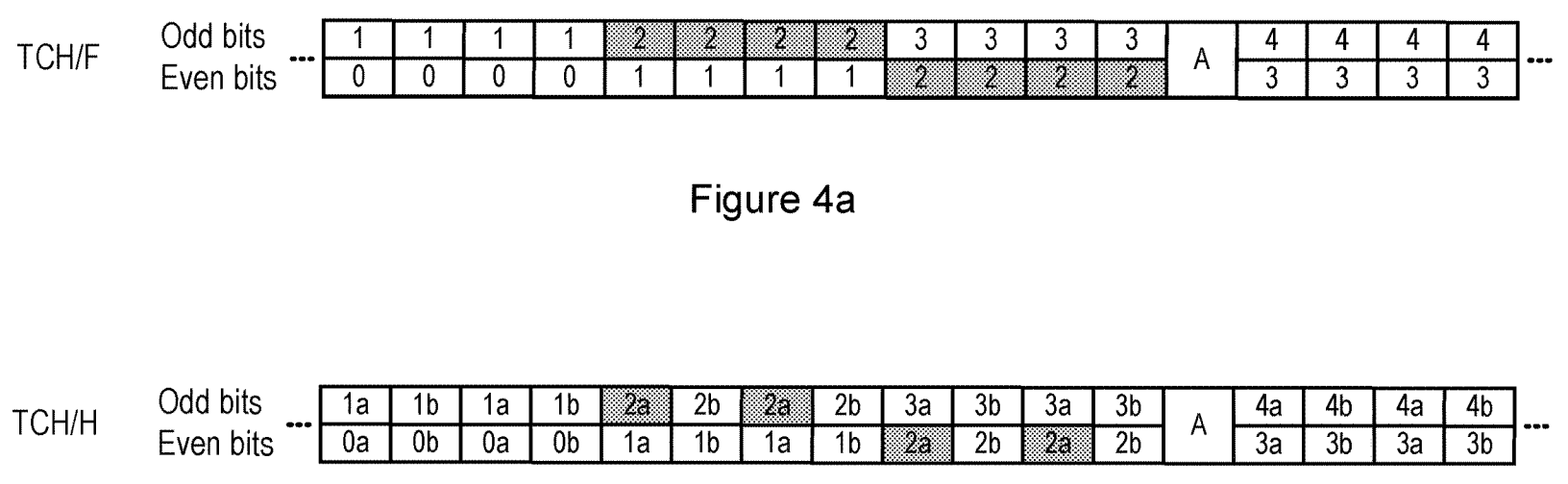

This is illustrated in FIGS. 4a and 4b relating to the full rate speech traffic channel (TCH/F) and half rate speech traffic channel (TCH/H), respectively, in which one speech frame is highlighted for illustration purposes, showing how the frames are partially overlapped. In other words, the frame labeled "2" in the TCH/F channel partially overlaps with the consecutive frame "3", and so on.

During a handover procedure the control plane signaling over the air interface is transmitted using a fast associated control channel (FACCH). FACCH works in a "stealing mode" which means that one or more speech frames are stolen when a FACCH block is sent. Table 2 below shows the number of stolen speech frames and the associated speech interruption, depending on whether a full rate speech channel (TCH/F) or a half rate speech channel (TCH/H) is used.

TABLE 2

| | Number of speech frames stolen | Speech interruption |
|---|---|---|
| Full rate (FACCH/F) | 1 | 20 ms |
| Half rate (FACCH/H) | 2 | 40 ms |

Next, with regard to speech interruption, the accumulated number of lost speech frames (which results in speech disturbance experienced by the user) will be estimated for the different handover procedures mentioned above. Although it is known that lost speech frames need not cause speech interruption at the receiver, the loss of speech frames due to stealing of FACCH or switching between base stations is referred to herein as a Speech Interruption Time (SIT). It is assumed that all control related messages being sent require a single FACCH block (which can be considered as a best case scenario).

Figure 5:
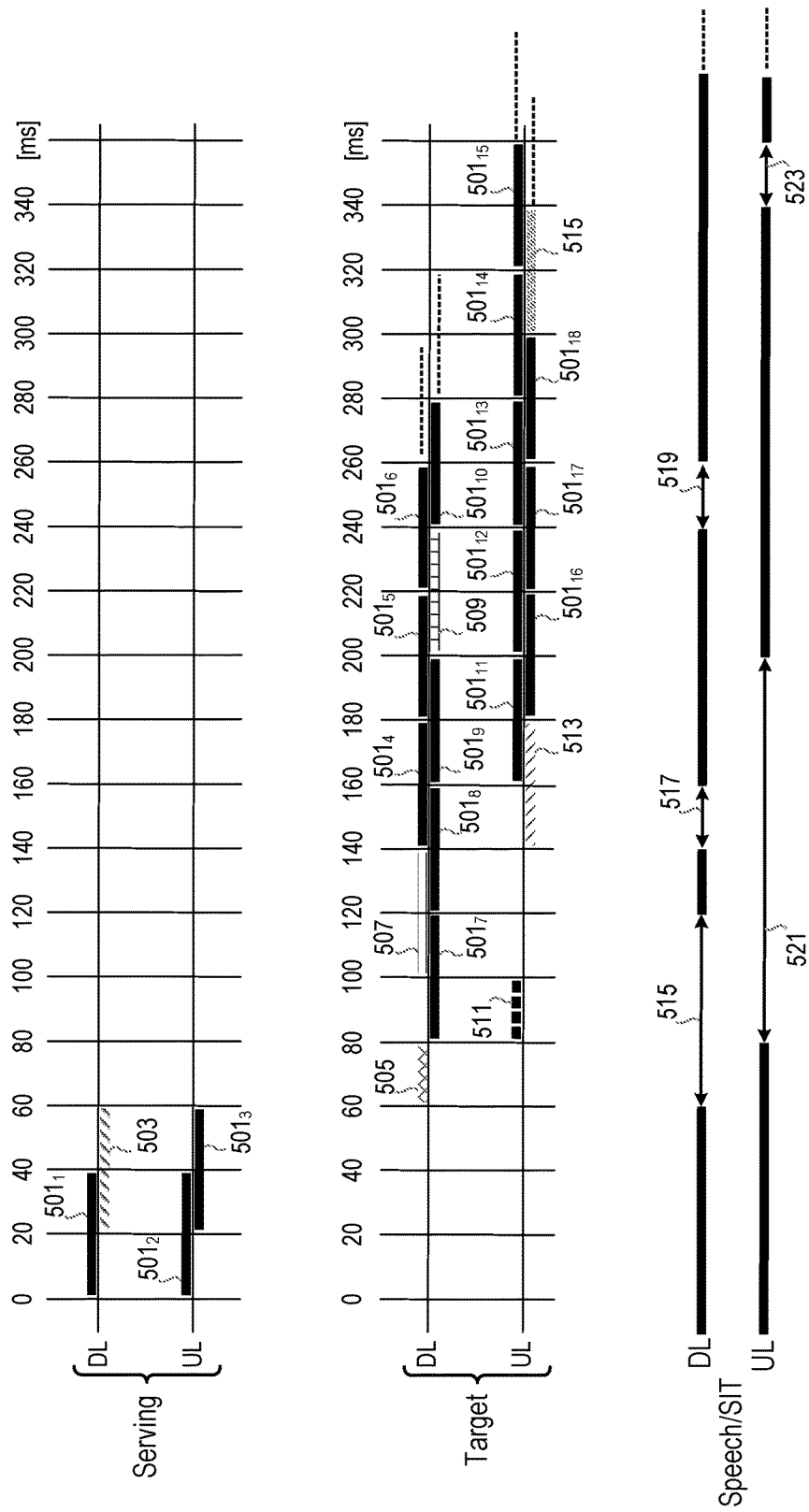
FIG. 5 illustrates the speech interruption times that can occur during handover, for example in a full rate and non-synchronized handover operation.

FIG. 5 illustrates the different messages that are sent during a typical handover procedure between a mobile station and a serving cell and target cell, for example a full rate and non-synchronized handover procedure, showing the speech interrupt times (SIT) that occur. In FIG. 5 a full rate channel (TCH/F) is assumed in both the serving and the target base stations.

The upper portion of FIG. 5 shows the transmissions that take place in the downlink and uplink of the serving cell. In the description below, each reference made to a "block" comprises 40 ms, corresponding to one speech frame (i.e. 20 ms of speech, but having a duration on the radio interface of 40 ms due to the diagonal interleaving as described above). Block $501_1$ represents a speech frame that is used to send speech to the mobile station in a downlink from the serving cell, while blocks $501_2$ and $501_3$ represent speech frames received at the serving cell in an uplink from the mobile station. Block 503 relates to time frames during which the handover command is sent on the downlink to the mobile station, for instructing the mobile station to perform a handover operation from the serving cell to the target cell.

The middle portion of FIG. 5 shows the transmissions that take place in the downlink and uplink of the target cell. Blocks $501_4$ to $501_{10}$ relate to speech frames during which speech can be sent from the target cell to the mobile station on a downlink. It is noted that a speech frame in FIG. 5 (and the various embodiments described later in the application) is drawn differently to a speech frame in FIG. 4, in order to improve the clarity of FIG. 5. In FIG. 5 a block (for example block $501_4$), drawn as a vertical box, corresponds to a speech frame (i.e. all the bits of a coded and diagonal interleaved speech frame, that is, having a duration of 40 ms on the radio interface, but comprising 20 ms of speech). In FIG. 4 on the other hand, this is drawn as a "broken" box, for example as shown by the shaded portion labeled "2" in FIG. 4a. A block in FIG. 5 is transmitted in half the available bits of eight consecutive bursts, as illustrated by the "broken" box in FIG. 4a. In view of this, the blocks in FIG. 5 (and the various embodiments described later) are illustrated as two parallel streams on each of the downlink and uplink, in order to illustrate more clearly where a particular speech frame exists along the time line. Block 505 relates to a time period during which the mobile station is to switch to a new channel and synchronize to a new frame structure (this time being variable, but assumed to be 20 ms in this example). Block 507 relates to frames during which physical information can be sent from the target cell on the downlink, while block 509 relates to frames for sending an unnumbered acknowledgement (UA) on the downlink.

With regard to the uplink to the target cell, block 511 relates to a frame during which four consecutive access bursts are transmitted from a mobile station. Blocks $501_{11}$ to $501_{18}$ relate to speech frames received at the target cell in the uplink from the mobile station. Block 513 relates to the frames used for receiving the set asynchronous balanced mode (SABM) information sent from the mobile station on the uplink to the target cell. Block 515 relates to the frames where the handover operation becomes complete.

The periods of speech and speech interruption times (SIT) are shown in the lower portion of FIG. 5, both for the uplink and downlink (speech shown as thick solid lines). In the downlink the speech interruption times comprise an interruption period 515 of 60 ms in duration (between 60 ms and 120 ms), interruption period 517 of 20 ms in duration (between 140 ms and 160 ms), and interruption period 519 of 20 ms in duration (between 240 ms and 260 ms), resulting in a total speech interruption time of 100 ms on the downlink.

Figure 6:
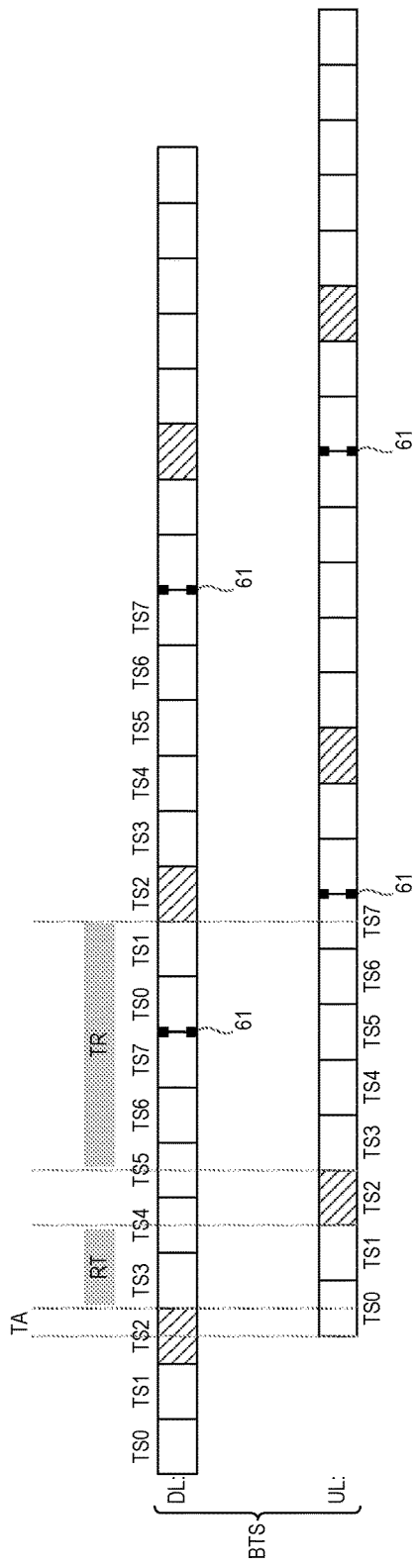
FIG. 6 illustrates the transmission and reception schedule in relation to switching times, during normal operation of a channel at full rate.

With regard to the positioning of the speech interruption periods, it is noted that a speech frame cannot be decoded and "played" in a mobile station's speaker until all bits have been received. For example, speech frame $501_7$ (a 20 ms speech frame which has a 40 ms duration on the radio interface due to diagonal interleaving) can be "played" starting at t=120 ms (when its last bit is received), and the playing of speech frame $501_7$ will end at t=140 ms (since its duration is 20 ms). At t=140 ms, a new speech interrupt 517 will start since the next speech frame ($501_8$) is not fully received until at t=160 ms, and so on. A half-duplex constraint is not a issue here since the radio alternates between Tx and Rx per burst, as shown in FIG. 6 below (with that level of detail having been excluded from FIG. 5 to improve the clarity of FIG. 5).

In the uplink the speech interruption times comprise an interruption period 521 of 120 ms in duration (between 80 ms and 200 ms), and interruption period 523 of 20 ms in duration (between 340 ms and 360 ms), resulting in a total speech interruption time of 140 ms on the uplink. The speech interruption periods exist for the reasons explained above, for example speech interruption 523 being caused by the processing of the handover complete message 515, which can only be processed from t=340 ms after the handover complete message 515 has been fully received.

GSM is a Time Division Multiple Access (TDMA) system meaning that resources on the same carrier frequency are shared between users with the use of different time slots. In each TDMA frame 8 timeslots are used.

GSM also uses FDD (Frequency Division Duplex), meaning that the downlink and uplink directions are separated in frequency.

Typically the mobile station supports half-duplex operation meaning that a mobile station cannot transmit and receive simultaneously but needs to switch between the two modes of operation.

In a circuit switched voice call in GSM a single time slot is assigned in the TDMA frame.

As shown in FIG. 6, the downlink and uplink frame structure is shifted by three timeslots. FIG. 6 shows TDMA frames comprising 8 timeslots TS0 to TS7 between TDMA frame borders 61, with timeslot TS2 shown in the example as being assigned as a circuit switched voice timeslot. It can be seen that the frame structure in the uplink is shifted by three timeslots (less a timing advance time period (TA) for compensating for propagation delays). A circuit switched voice call will use the same timeslot in the downlink and uplink.

From FIG. 6 it can be seen that due to the half-duplex operation in GSM there will be a maximum requirement on switching times for a mobile station, both between reception and transmission, and also between transmission and reception. In FIG. 6 the time period labeled RT represents the maximum switching time of a mobile station for switching between reception to transmission (i.e. between reception of a timeslot such as TS2 on the downlink and transmission of a corresponding timeslot TS2 on the uplink), while the time period labeled TR represents the maximum switching time of a mobile station for switching between transmission and reception (i.e. between transmitting a timeslot such as TS2 on the uplink and reception of the next timeslot TS2 on the downlink).

It will be appreciated that the timing advance signal will therefore have an effect on the maximum switching times of a mobile station. During the time periods RT and TR corresponding to switching times, the mobile station can also perform other tasks, such as neighbor cell measurements.

There are multislot classes defined in the 3GPP GSM EDGE Radio Access Network (GERAN) specifications that apply to circuit switched or packet switched connections when multiple timeslots are used in either direction, or both, as described in the technical specification relating to 3GPP TS 45.002 (Multiplexing and multiple access on the radio path, Release 11, version 11.3.0).

The multi slot classes define both the switching times that relate to "get ready to transmit" ($T_{tb}$) and "get ready to receive" ($T_{rb}$). There is also an extended switching time if the service requires adjacent channel measurements ($T_{ta}$ and $T_{ra}$ respectively). In the scope of the embodiments of the present invention, as described later in the application, it is noted that no allowance is made for time for adjacent channel measurements, due to the limited time duration of the handover procedure. Thus, where references to these multi slot classes are used in the context of the embodiments described below, only the times relating to "get ready to transmit" ($T_{tb}$) and "get ready to receive" ($T_{rb}$) are applicable.

A disadvantage of such systems is that frame losses will result in a perceived degradation of speech quality, especially if the handovers occur frequently. The frame losses occur when the mobile station disconnects from the channel in the serving cell and connects to the channel in the target cell, and in particular before the transmission/reception of speech frames can be resumed.

The embodiments of the invention as described below provide methods and apparatus for reducing or eliminating speech frame losses or throughput losses during a handover operation.

The embodiments of the invention are configured to adapt the time division multiple access (TDMA) technique used in GSM, in order to allow a mobile station to interchange signaling messages with a target base station without losing the connection to the serving base station, that enables the continuation of the transmission/reception of user data (such as speech or data) on the user plane.

Although certain embodiments will be described in the context of circuit switched voice calls, it is noted that the embodiments are also applicable to circuit switched data, or the packet switching domain (both for voice and/or data).

Furthermore, although the embodiments are described in relation to inter-cell handover (i.e. handover between different cells), the embodiments are also applicable to intra-cell handover (for example when making a handover between channels within the same cell). As such, references to serving cells and target cells may refer to different cells, or the same cell, depending upon whether inter-cell handover or intra-cell handover is being used, respectively.

Figure 7A:
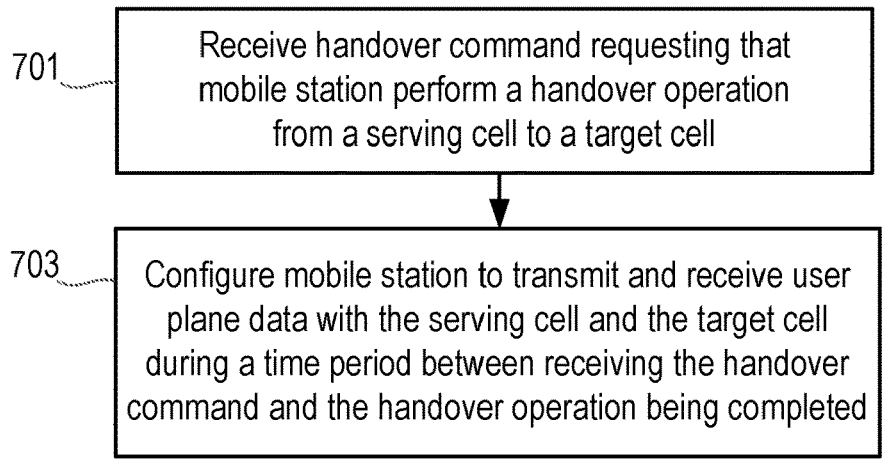
FIG. 7a shows a method in a mobile station according to an embodiment.

FIG. 7a shows a method according to an embodiment, for improving handover in a mobile station configured to operate a time division multiple access, TDMA, protocol in a global system for mobile communications, GSM, telecommunication network. The method comprises the steps of receiving a handover command requesting that the mobile station perform a handover operation from a serving cell to a target cell, step 701, and configuring the mobile station to transmit and receive user plane data with the serving cell and the target cell during a time period between receiving the handover command and the handover operation being completed, step 703.

Figure 7B:
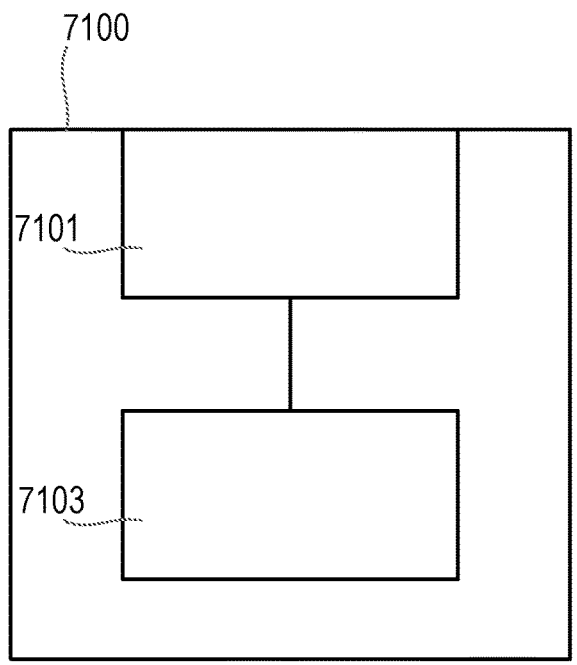
FIG. 7b shows a mobile station according to an embodiment.

FIG. 7b shows a mobile station according to an embodiment, configured to operate a time division multiple access, TDMA, protocol in a global system for mobile communications, GSM, telecommunication network. The mobile station comprises an interface unit 7101 configured to receive a handover command requesting that the mobile station perform a handover operation from a serving cell to a target cell; and a processing unit 7103 configured to control transmission and reception of user plane data with the serving cell and the target cell during a time period between receiving the handover command and the handover operation being completed.

Figure 7C:
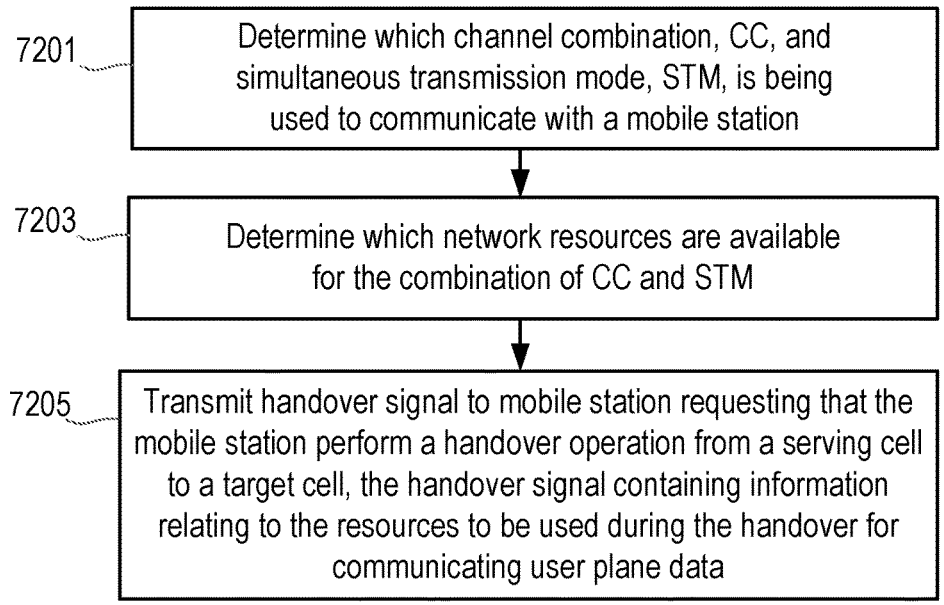
FIG. 7c shows a method in a network node according to an embodiment.

FIG. 7c shows a method according to an embodiment, in a network node that is configured to operate a time division multiple access, TDMA, protocol in a global system for mobile communications, GSM, telecommunication network. The method comprises the steps of determining which channel combination, CC, and simultaneous transmission mode, STM, is being used to communicate with a mobile station, step 7201. In step 7203 it is determined which network resources are available for the combination of CC and STM. The method comprises the step of transmitting a handover signal to a mobile station, requesting that the mobile station perform a handover operation from a serving cell to a target cell, the handover signal containing information relating to the resources to be used during the handover for communicating user plane data, step 7205, such that the mobile station is configurable to transmit and receive user plane data with the serving cell and the target cell during a time period between the handover signal transmitted from the network node being received by the mobile station and the handover operation being completed.

Figure 7D:
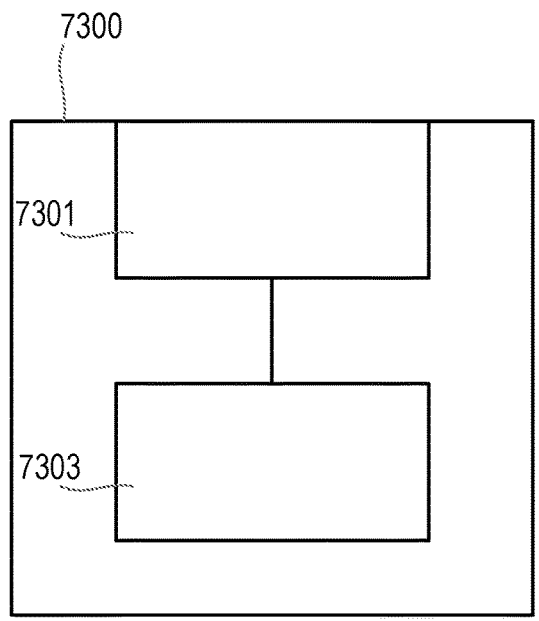
FIG. 7d shows a network node according to an embodiment.

FIG. 7d shows a network node according to an embodiment, configured to operate a time division multiple access, TDMA, protocol in a global system for mobile communications, GSM, telecommunication network. The network node comprises a processing unit 7303 configured to: determine which channel combination, CC, and simultaneous transmission mode, STM, is being used by a mobile station; and determine which network resources are available for the combination of CC and STM. An interface unit 7301 is configured to transmit a handover signal to a mobile station requesting that the mobile station perform a handover operation from a serving cell to a target cell, the handover signal containing information relating to the resources to be used during the handover for communicating user plane data, such that the mobile station is configurable to transmit and receive user plane data with the serving cell and the target cell during a time period between the handover signal transmitted from the network node being received by the mobile station and the handover operation being completed.

From the above it can be seen that the mobile station, upon being instructed by the network to start a handover procedure from a serving cell to a target cell, is configured to keep the connection to both the serving and target cell until the handover operation is completed, such that user plane data is communicated with both the serving cell and the target cell during a period between the handover signal or command being received and the handover operation being completed. This is in contrast to current operation where the mobile station switches from the serving cell to the target cell during the handover procedure, resulting in a larger time of speech interruption.

A mobile station is therefore effectively connected simultaneously to both the serving cell and the target cell for at least a portion of the handover operation, and exchanges user plane data such as speech and/or user data with both the serving cell and the target cell during at least a portion of the handover operation.

The embodiments have the advantage that they enable half-duplex operation to be retained by the mobile station, such that keeping the connection to both cells does not impose any additional requirements on the current mobile station hardware, such as providing dual receiver/transmitter chains. In other words, a mobile station according to an embodiment is able to communicate with both the serving cell and the target cell during a handover operation using a single transmitter and single receiver that operate in half-duplex mode.

Thus, to facilitate the retention of the connection to the serving cell while signaling with the target cell, the physical layer of the mobile station is configured to alternate between transmission and/or reception to/from the serving cell and target cell. The network is configured to coordinate the radio resource allocation in the target cell and serving cell to allow the mobile station to operate in this manner with a single half-duplex radio.

The adaptation of the TDMA transmission technique can be performed in relation to different modes of operations, that can be envisaged as shown below.

Since a traffic channel can operate at a full rate or a half rate as described in the background section, the different channel combinations for the traffic channels in the serving and target cell are listed in Table 3 below.

TABLE 3

| Channel combination | Traffic channel serving | Traffic channel target |
|---|---|---|
| CC1 | FR | FR |
| CC2 | FR | HR |
| CC3 | HR | FR |
| CC4 | HR | HR |

From the above it can be seen that there is established a set of channel combinations, each channel combination relating to whether a traffic channel is operating in a full rate mode or half rate mode of communication.

The adaptation of the TDMA transmission technique can also be performed in relation to different simultaneous transmission modes (STMs) of operation. Table 4 below provides an example of the different forms of simultaneous transmission modes that can be used to determine how the TDMA transmission technique should be adapted.

TABLE 4

| Simultaneous transmission mode | Simultaneous link operation |
|---|---|
| STM1 | Only in DL |
| STM2 | Only in UL |
| STM3 | In both directions |

As can be seen from FIG. 5 of the background section described above, there will be different durations of speech interruption times in each direction of speech transfer, i.e.

the downlink and uplink. In FIG. 5 the downlink SIT was 100 ms while the uplink SIT was 140 ms. Thus, in scenarios where the mobile station cannot support simultaneous operation in both the uplink and downlink, the handover command could indicate the use of only one of the links for simultaneous operation. The different simultaneous transmission modes defined in Table 4 therefore reflect this, such that the TDMA transmission technique can be adapted accordingly, depending upon which form of simultaneous transmission mode is required by a particular application or scenario.

Thus, from the above it can be seen that there is established a set of simultaneous transmission modes, each simultaneous transmission mode relating to whether simultaneous communication is only provided in a downlink to the mobile station, only in an uplink from the mobile station, or in both downlink and uplink directions.

Then, based on which combination of channel combination mode and simultaneous transmission mode is selected for a particular application or scenario, the scheduling of transmission and reception of TDMA timeslots can be controlled accordingly.

Further details will now be provided in relation to handover procedures according to embodiments of the invention. As mentioned above, the embodiments are applicable to both inter-cell handover and intra-cell handover. In the case of intra-cell handover the signaling procedure is simplified since both the observed time difference (OTD) and the real time difference (RTD) equal zero (i.e. OTD=RTD=0), while the timing advance signals for the "serving" cell and "target" cell (i.e. the same cell) are equal (i.e. TA0=TA1). It is noted that the same switching times apply as for the inter-cell handover, as described further below, except that no switching time is needed between transmission and transmission (Tx→Tx), or reception and reception (Rx→Rx), if the two channels are within the same TDMA frame (which implies that the same frequency is used).

In FIG. 5 of the background section above, reference was made to the transmission of access bursts 511 from a mobile station to the target cell during a handover operation. In the current specifications for the different variants of synchronized handover, the network can indicate if the access bursts to send a Handover access is mandatory or optional (as described in section 10.5.2.28a in 3GPP TS 44.018, Release 11, version 11.6.0, by the setting of Bit 8 of an Access Type Control, Octet 2). Hence, since the network will not know if access bursts are sent from the mobile station the information in these cannot be considered necessary for the handover procedure. Therefore, in order to limit the overhead in terms of control signaling during a handover procedure, according to an embodiment the access bursts are not used when accessing the target cell in the case of seamless handover when using a synchronized handover procedure. Thus, according to such an embodiment, a mobile station may be configured such that it is forbidden to send access bursts during the handover procedure.

According to an embodiment, restrictions are imposed on switching times of a mobile station, depending upon how the TDMA scheduling is being adapted in order to allow simultaneous communication with both the serving cell and the target cell. Switching time requirements can therefore be defined which are based on a subset of the different channel combination (CC) modes (as defined in Table 3 above) and the different simultaneous transmission modes (STM, as defined in Table 4 above), as will be described further below.

The switching times are defined in order to allow full flexibility for the different forms of handover operation, and may comprise new switching times. Alternatively, currently defined switching times from multislot classes can be re-used in certain circumstances to minimize the impact on technical specifications and the implementation of embodiments of the invention. For example, one such example is where no adjacent channel measurements are required (i.e. whereby only switching times that relate to "get ready to transmit" ($T_{tb}$) and "get ready to receive" ($T_{rb}$) are used, and whereby extended switching times for adjacent channel measurements ($T_{ta}$ and $T_{ra}$ respectively) are not used due to the limited time duration of the handover procedure).

Certain embodiments define switching times between two reception periods on different frequencies and between two transmission periods of different frequencies if that time is different from the switching time between transmission→reception, or reception→transmission.

Since there will be a dependency of switching times between frame structures of different cells it is necessary for the network to have knowledge or a good estimation of the timing difference in the frame structure. Since TA0 is always known (as described above in relation to FIG. 2) there is a need to know at least two out of OTD, RTD and TA1, (as also described in FIG. 2), to acquire the required information.

According to one embodiment, where the switching time requirements are not so critical, there is only a need for the network to know the frame alignment between the serving cell and target cell sufficiently well enough in order to determine which resources to assign in the target cell or base station. In such an example the regular handover procedure applied to non-synchronized handover still applies, with the addition of simultaneous transmission in either one, or both links.

It is noted that in order to effectively support the different embodiments, there is defined a specification of new switching classes for the mobile station. Alternatively, as mentioned earlier, according to some embodiments of the invention it is also be possible to re-use the current switching times of the mobile station, defined by the multislot classes (as described in technical specification 3GPP TS 45.002, Release 11, version 11.3.0).

As can be seen from FIG. 6 described earlier, and from the Figures described below, switching times will be required for all combinations of transmission and reception (i.e. Tx→Tx, Tx→Rx, Rx→Rx, Rx→Tx).

To provide granularity, the switching times may be defined in integer values of time slots, or either half-symbol periods (as the observed time difference OTD is defined) or in full symbol periods (as a timing advance signal TA is defined). However, it is noted that the embodiments are intended to cover the switching times being defined in non-integer timeslots, or non symbol periods. Table 5 below provides an example of three different mobile station switching classes that may be used in embodiments of the invention, with the switching times being defined in symbol periods. It is noted that different switching times may be used without departing from the scope of the invention as defined in the appended claims.

TABLE 5

| Switching class | Tx → Tx | Tx → Rx | Rx → Rx | Rx → Tx |
|---|---|---|---|---|
| 1 | 10 | 15 | 12 | 17 |
| 2 | 12 | 17 | 14 | 19 |
| 3 | 15 | 18 | 15 | 19 |

An application of an embodiment will now be described with reference to a scenario whereby the channel combination mode relates to a full rate traffic channel being provided in both the serving cell and the target cell (defined as channel combination mode CC1 in Table 3 above), and whereby a simultaneous transmission mode in both the downlink and uplink is used (defined as simultaneous transmission mode STM3 in Table 4 above), i.e. a combination of CC1 and STM3.

An aspect relating to the time alignment between the frame structures of a serving cell and a target cell is that the time alignment shall not result in required switching times that are smaller than the specified switching time of the mobile station (either the newly defined switching times provided by embodiments of the invention, or the current switching times provided by other embodiments of the invention).

It is noted that an application having a channel combination mode CC1 and simultaneous transmission mode STM3 is the most demanding case for a mobile station since it has to transmit and receive twice per TDMA frame, and consequently the switching times will be small. For some values of the timing advance (TA) in the serving and target cells and the observed time difference (OTD), this handover case may not always be possible.

Figure 8:
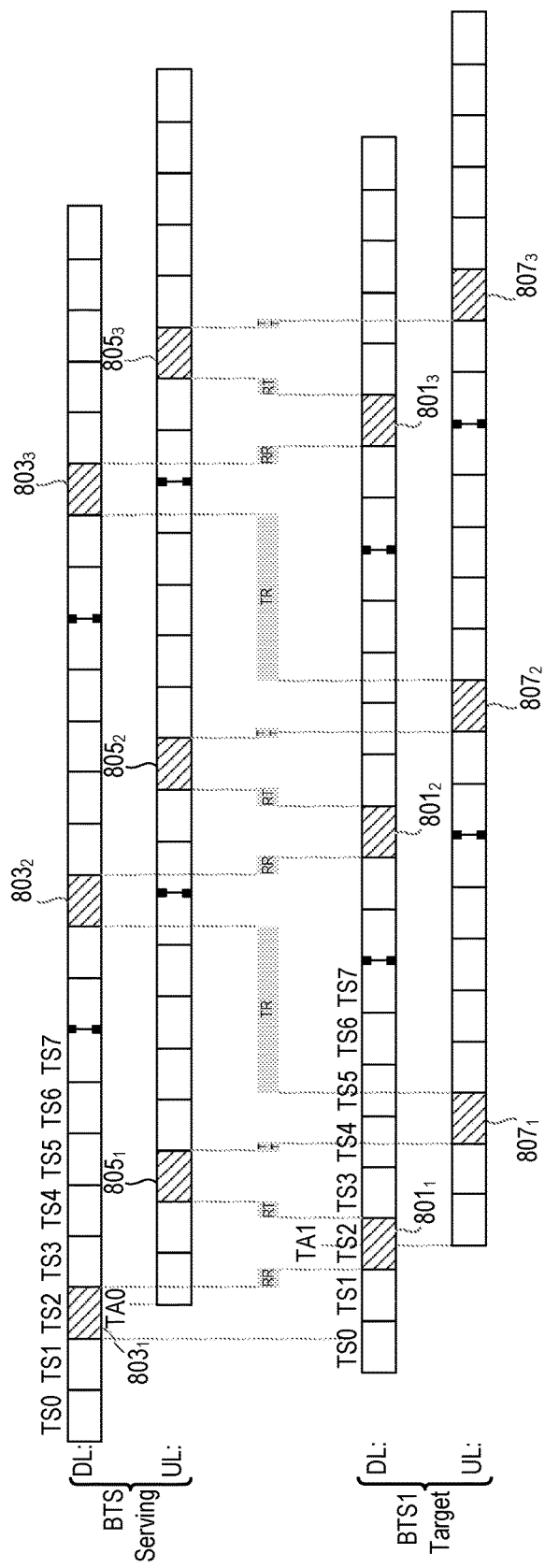
FIG. 8 shows an example of a transmission and reception schedule and switching times according to an embodiment.
Figure 9:
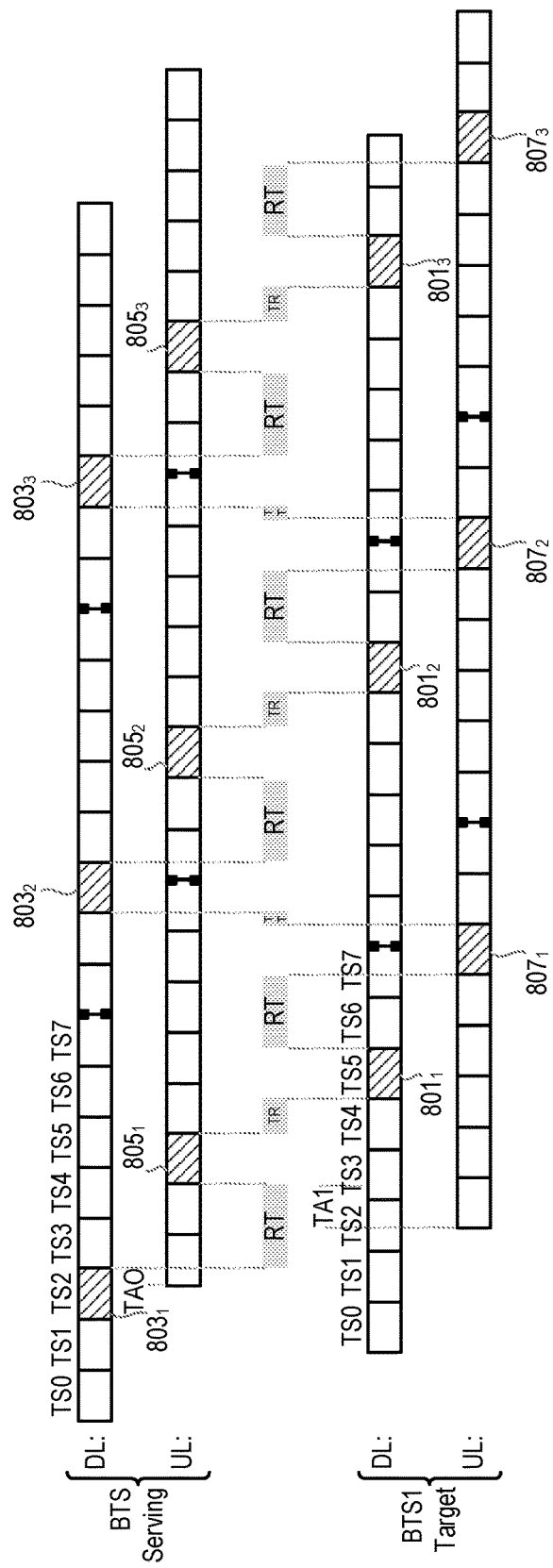
FIG. 9 shows an example of a transmission and reception schedule and switching times according to an embodiment.

FIGS. 8 and 9 below show two examples of transmission/reception schedules and corresponding switching times for this particular embodiment relating to CC1 and STM3. In the example of FIGS. 8 and 9 eight timeslots are shown between frame borders, with time slot TS2 being assigned as a circuit switched voice time slot in the example.

In the first case shown in FIG. 8, a Rx slot $801_1$ in the target cell is scheduled between a Rx slot $803_1$ and a Tx slot $805_1$ in the serving cell, while a Tx slot $807_1$ in the target cell is scheduled between the Tx slot $805_1$ and a Rx slot $803_2$ in the serving cell.

RR corresponds to the maximum switching time between reception and reception (Rx→Rx), e.g. between Rx slot $803_1$ being received in a mobile station from the downlink of the serving cell and Rx slot $801_1$ being received at a mobile station from the downlink of a target cell;

RT corresponds to the maximum switching time between reception and transmission (Rx→Tx), e.g. between Rx slot $801_1$ being received in a mobile station from the downlink of the target cell and Tx slot $805_1$ being transmitted from a mobile station on the uplink to the serving cell;

TT corresponds to the maximum switching time between transmission and transmission (Tx→Tx), e.g. between Tx slot $805_1$ being transmitted from a mobile station on the uplink to the serving cell and Tx slot $807_1$ being transmitted from a mobile station on the uplink to the target cell;

TR corresponds to the maximum switching time between transmission and reception (Tx→Rx), e.g. between Tx slot $807_1$ being transmitted from a mobile station on the uplink to the target cell and Rx slot $803_2$ being received in a mobile station from the downlink of the serving cell).

In the second case shown in FIG. 9, both the Rx slot $801_1$ and the Tx slot $807_1$ of the target cell are scheduled between the Tx slot $805_1$ and the Rx slot $803_2$ of the serving cell. The maximum switching times for RT, TT and TR are shown in FIG. 9.

Figure 10:
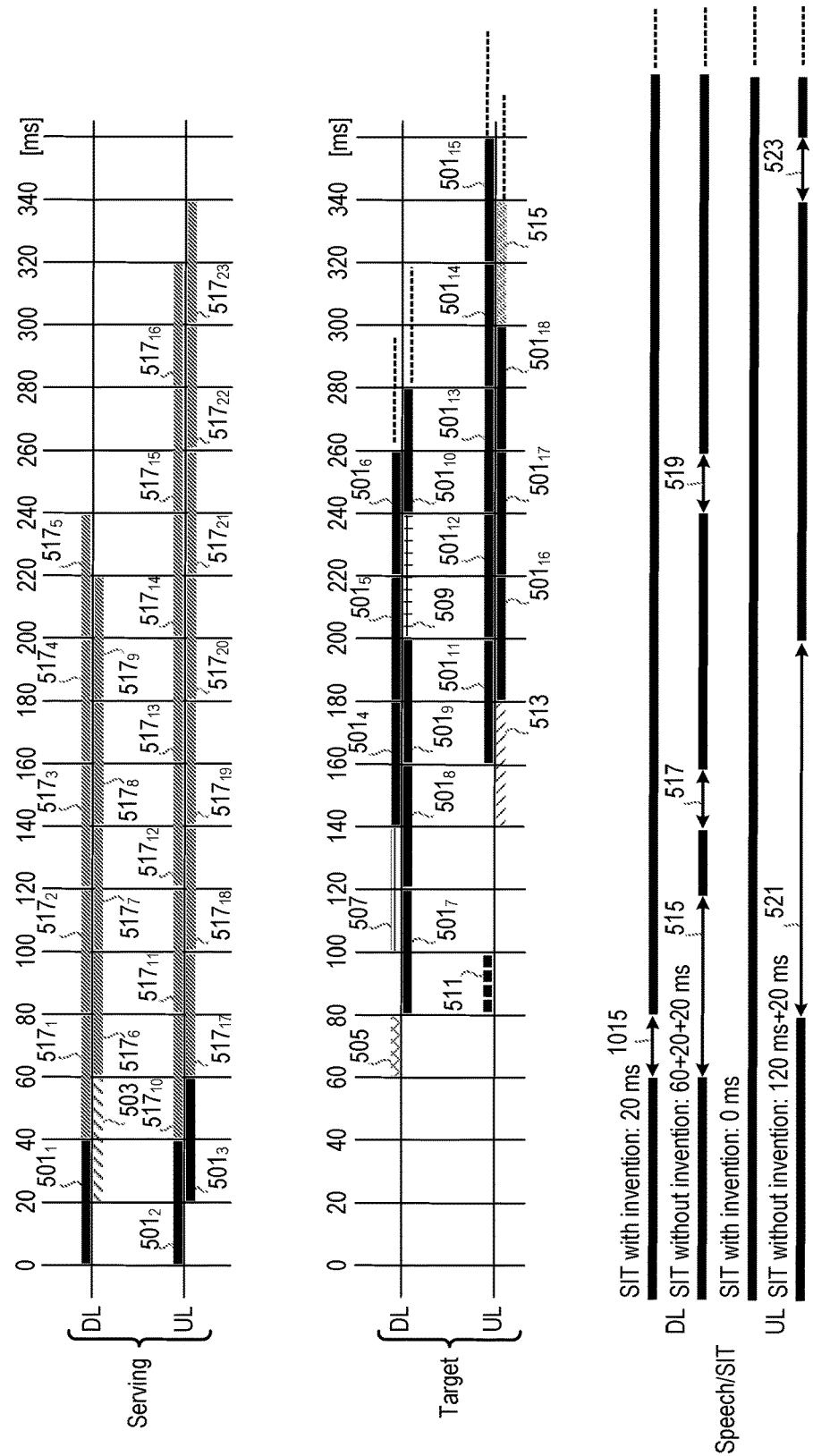
FIG. 10 illustrates speech interruption times with and without the embodiments of FIGS. 8 and 9, in an example relating to full rate and a non-synchronized handover procedure.

The reduced speech interruption times according to the embodiments of FIGS. 8 and 9 can be seen from FIG. 10, whereby the scheduling techniques in FIGS. 8 and 9 result in the improvement illustrated in FIG. 10.

FIG. 10 is similar to FIG. 5, and shows the different messages that are sent during a typical handover procedure between a mobile station and a serving cell and target cell, for example a full rate and non-synchronized handover procedure. In the example of FIG. 10 a full rate channel (TCH/F) is assumed in both the serving and the target base stations.

The upper portion of FIG. 10 shows the transmissions that take place in the downlink and uplink of the serving cell. Block $501_1$ represents a speech frame that is used to send speech to the mobile station in a downlink from the serving cell (i.e. received at the mobile station), while blocks $501_2$ and $501_3$ represent speech frames received at the serving cell in an uplink from the mobile station (i.e. transmitted from the mobile station). Block 503 relates to time frames during which the handover command is sent on the downlink to the mobile station, for instructing the mobile station to perform a handover operation from the serving cell to the target cell.

The middle portion of FIG. 10 shows the transmissions that take place in the downlink and uplink of the target cell. Blocks $501_4$ to $501_{10}$ relate to speech frames during which speech can be sent from the target cell to the mobile station on a downlink. Block 505 relates to a time period during which the mobile station is to switch to a new channel and synchronize to a new frame structure (this time being variable, but assumed to be 20 ms in this example). Block 507 relates to frames during which physical information can be sent from the target cell on the downlink, while block 509 relates to frames for sending an unnumbered acknowledgement (UA) on the downlink.

With regard to the uplink to the target cell, block 511 relates to a frame during which four consecutive access bursts cab be transmitted from a mobile station. Blocks $501_{11}$ to $501_{18}$ relate to speech frames received at the target cell in the uplink from the mobile station. Block 513 relates to the frames used for receiving the set asynchronous balanced mode (SABM) information sent from the mobile station on the uplink to the target cell. Block 515 relates to the frames where the handover operation becomes complete.

However, unlike FIG. 5, FIG. 10 illustrates that this particular embodiment, corresponding to the TDMA scheduling techniques described in FIGS. 8 and 9, introduces further speech frames during which it is possible to transmit on the downlink and/or uplink of the serving cell, during at least a period between a handover signal being received at a mobile station and a handover operation being completed. In particular, blocks $517_1$ to $517_9$ relate to additional frames that are made available on the downlink of the serving cell, while blocks $517_{10}$ to $517_{23}$ relate to additional frames that are made available on the uplink of the serving cell. As such, a mobile station can continue to communicate with a serving cell using one or more of these frames, during the time when the mobile station is signaling with the target cell to perform the handover operation (and during at least a period between a handover signal being received at a mobile station and a handover operation being completed).

In the lower portion of FIG. 10 there is shown a comparison of speech interruption times (SIT), both for the uplink and downlink (and illustrated both with and without the embodiments of the invention, with speech being shown in the thick solid lines).

In the downlink, this embodiment results in a speech interruption time comprising an interruption period 1015 of 20 ms in duration between 60 ms and 80 ms (compared to a interruption period 515 of 60 ms, interruption period 517 of 20 ms and interruption period 519 of 20 ms without the invention). Therefore, according to this embodiment the total speech interruption time on the downlink comprises 20 ms, compared to a total speech interruption time of 100 ms without the invention.

The reduction in speech interruption time can be explained further as follows. According to the prior art the scheduling shown in FIG. 6 of the background section is used, whereby the mobile station rapidly alternates between reception and transmission of signals (bursts) from/to one base station. At a certain point in time (when commanded to perform a handover), the mobile station performs a handover procedure from one base station (serving base station) to another base station (target base station). When the mobile station has tuned to the new base station (new frequency and new timing), the mobile station resumes the rapid alternation between transmitting and receiving bursts, but with the target base station. Before the handover procedure the mobile station can only communicate with the serving base station, and after, the mobile station can only communicate with the target base station. However, as can be seen from the embodiments of FIGS. 8 and 9, the scheduling is reconfigured such that it is possible to transmit and receive from/to both serving and target base stations simultaneously (by alternately transmitting/receiving to each base station per burst, and switching at a fast rate such that it appears to communicate with both simultaneously). The mobile station now (even more) rapidly alternates between receiving from the serving cell, transmitting to the serving cell, receiving from the target cell, and transmitting to the target cell. Thus, according to the embodiments there are effectively four simultaneous links (two downlink and two uplink) instead of two according to the prior art.

To accommodate the above, according to an embodiment the network is configured to analyze the timing (t0, t1, OTD) and the capabilities of the mobile station (for example supported switching time), and select a timeslot to use in the serving cell that allows the mobile station to switch back and forth (if such a timeslot exists). By doing this, the mobile station can receive speech frames $517_1$ to $517_9$ from the serving cell in the downlink even after tuning into the target cell, and thereby it will not lose speech frames during the handover procedure or when the target cell transmits control signaling.

In the uplink, according to embodiments of the invention it can be seen that there is no speech interruption time (compared to a interruption period 521 of 120 ms and interruption period 523 of 20 ms without the invention, which results in a total speech interruption time of 140 ms). For similar reasons to those explained above, the mobile station can continue to transmit speech frames $517_{17}$ to $517_{23}$ in the uplink of the serving cell until it is allowed to transmit them in the target cell.

Figure 11:
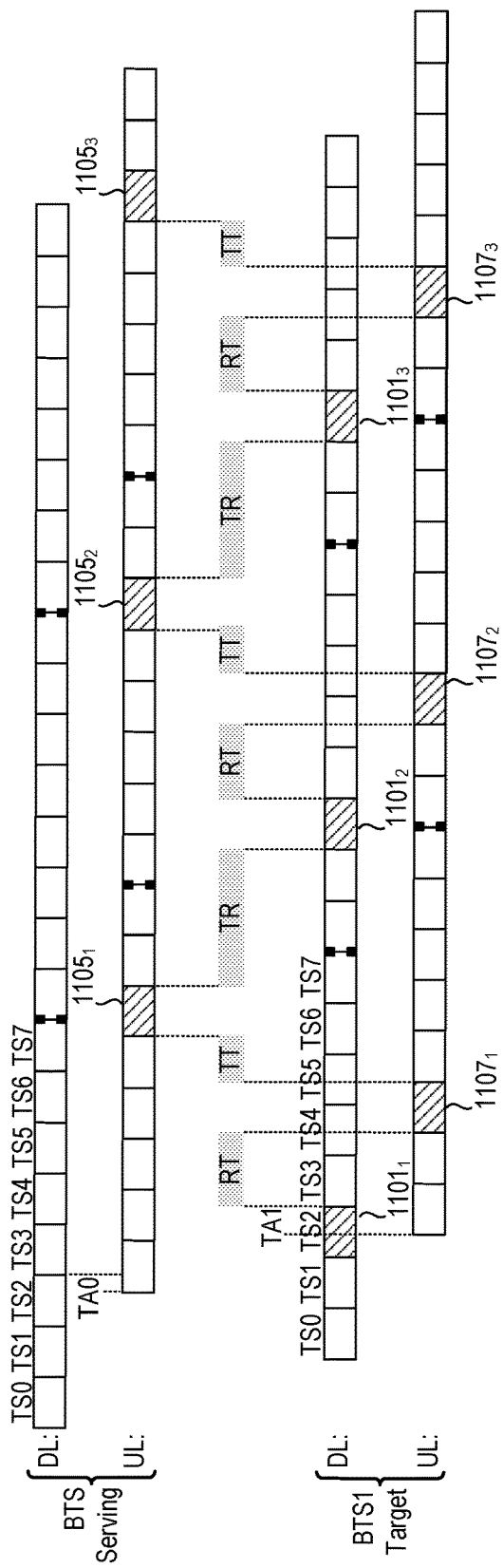
FIG. 11 shows an example of a transmission and reception schedule and switching times according to an embodiment.

With reference to FIG. 11, an application of an embodiment will now be described with reference to a scenario whereby the channel combination mode relates to a full rate traffic channel being provided in both the serving cell and the target cell (defined as channel combination mode CC1 in Table 3 above), and whereby a simultaneous transmission mode is used in the uplink only (defined as simultaneous transmission mode STM2 in Table 4 above), i.e. a combination of CC1 and STM2.

This particular scenario does not put as high demands on switching times. In fact, in that aspect it is similar to the normal operation, during which the mobile station is not required to transmit in another cell but instead perform measurements on a neighbor cell.

FIG. 11 shows an example of the transmission/reception schedule and corresponding switching times for this particular scenario. In this example eight timeslots are shown between frame borders, with time slot TS5 being assigned as a circuit switched voice time slot in the uplink (shown as $1105_1$ to $1105_3$).

In the target cell the Rx slots (1101) and Tx slots (1107) are scheduled between the Tx slots 1105 on the uplink of the serving cell. For example, in the target cell Rx slot $1101_2$ and Tx slot $1107_2$ are scheduled between Tx slot $1105_1$ and Tx slot $1105_2$.

RT corresponds to the maximum switching time between reception and transmission (Rx→Tx), e.g. between Rx slot $1101_1$ being received in a mobile station from the downlink of the target cell and Tx slot $1107_1$ being transmitted from a mobile station on the uplink to the target cell;

TT corresponds to the maximum switching time between transmission and transmission (Tx→Tx), e.g. between Tx slot $1107_1$ being transmitted from a mobile station on the uplink to the target cell and Tx slot $1105_1$ being transmitted from a mobile station on the uplink to the serving cell;

TR corresponds to the maximum switching time between transmission and reception (Tx→Rx), e.g. between Tx slot $1105_1$ being transmitted from a mobile station on the uplink to the serving cell and Rx slot $1101_2$ being received by a mobile station on the downlink from the target cell.

Thus, according to this embodiment the mobile station will communicate speech with the serving cell during a time when, according to the prior art, it could otherwise be making measurements on neighboring cells. In the prior art a mobile station connected to the serving cell would be required to make a signal strength measurement on a neighboring cell at some time between timeslot $1107_1$ and $1101_2$ (and between $1107_2$ and $1101_3$ etc) in FIG. 11, whereby this embodiment will communicate speech during at least a portion of this period.

It is noted that the speech interruption time in the uplink, according to this embodiment, is the same as that described above in relation to FIG. 10, whereby the speech interruption time is reduced from 140 ms to 0 ms. This is made possible by the mobile station being able to continue transmitting speech frames in the serving cell until it is allowed to transmit them in the target cell. It will be appreciated that the speech interruption time in the downlink will not be affected by this embodiment.

Figure 12:
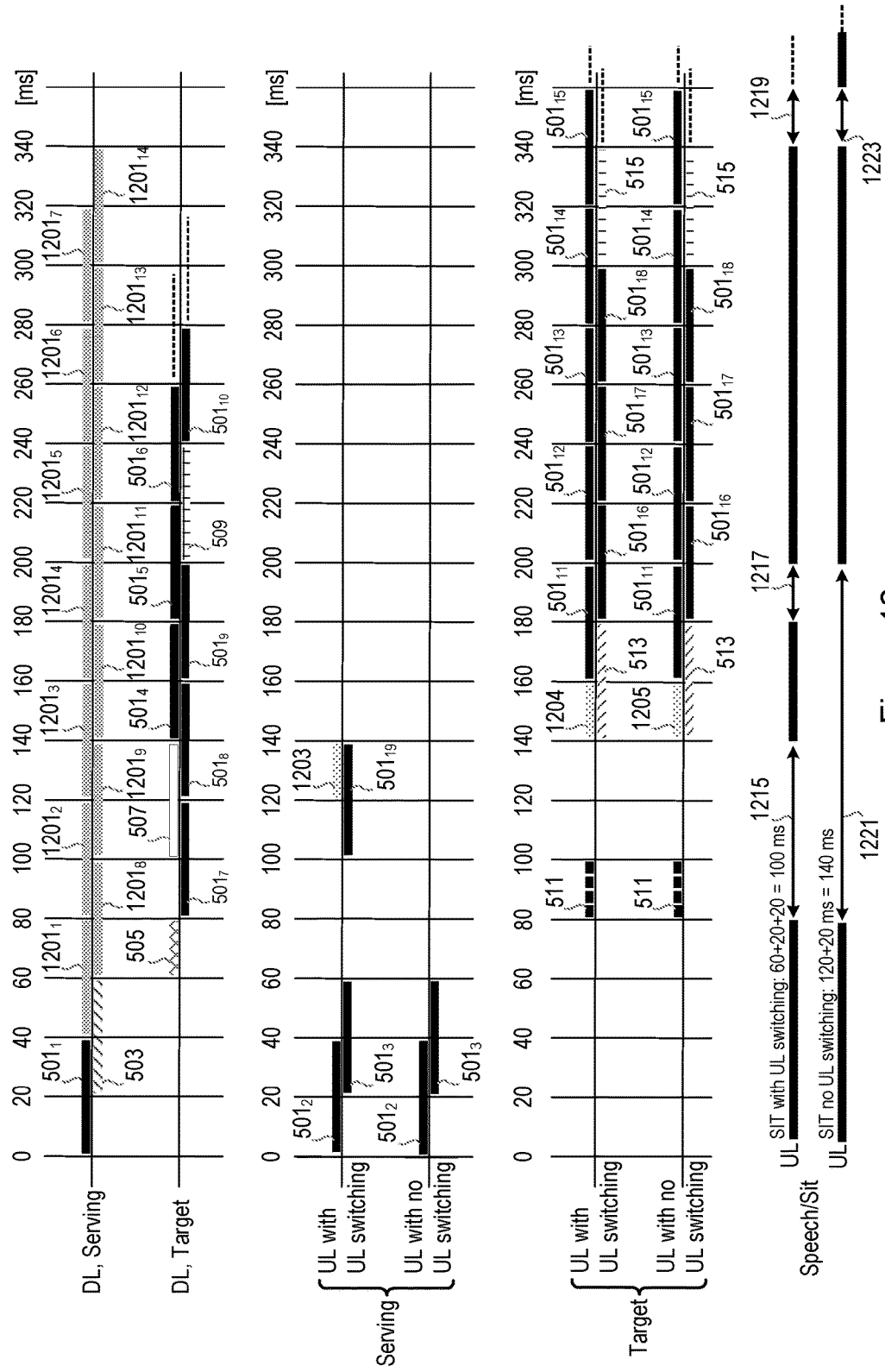
FIG. 12 illustrates speech interruption times in an example with and without uplink switching, and with full rate channels.

With reference to FIG. 12, an application of an embodiment will now be described with reference to a scenario whereby the channel combination mode relates to a full rate traffic channel being provided in both the serving cell and the target cell (defined as channel combination mode CC1 in Table 3 above), and whereby a simultaneous transmission mode is used in the downlink only (defined as simultaneous transmission mode STM1 in Table 4 above), i.e. a combination of CC1 and STM1.

If only simultaneous downlink transmission is used, as per STM1, different options on how to connect to the different base stations are possible for the uplink transmissions. When the uplink connection is switched between the serving and target base stations or cells, it is referred to as "uplink switching". The principle is shown in FIG. 12.

In the downlink of the serving cell, in a similar manner to FIG. 5 above, block $501_1$ represents speech frames that are used to send speech to the mobile station in a downlink from the serving cell, while block 503 relates to time frames during which the handover command is sent on the downlink to the mobile station, for instructing the mobile station to perform a handover operation from the serving cell to the target cell.

In the downlink of the target cell, blocks $501_4$ to $501_{10}$ relate to speech frames during which speech can be sent from the target cell to the mobile station on a downlink. Block 505 relates to a time period during which the mobile station is to switch to a new channel and synchronize to a new frame structure (this time being variable, but assumed to be 20 ms in this example). Block 507 relates to frames during which physical information can be sent from the target cell on the downlink, while block 509 relates to frames for sending an unnumbered acknowledgement (UA) on the downlink.

Blocks $1201_1$ to $1201_{14}$ in the downlink of the serving cell represent blocks during which it is possible to transmit speech frames due to this embodiment, as described below.

With regard to the uplink, this is shown with uplink switching and without uplink switching, both for the serving cell and target cell. Blocks $501_2$ and $501_3$ represent speech frames received at the serving cell in an uplink from the mobile station (either with or without uplink switching).

In the target cell, block 511 relates to a frame during which four consecutive access bursts are transmitted from a mobile station. Blocks $501_{11}$ to $501_{18}$ relate to speech frames received at the target cell in the uplink from the mobile station. Block 513 relates to the frames used for receiving the set asynchronous balanced mode (SABM) information sent from the mobile station on the uplink to the target cell. Block 515 relates to the frames where the handover operation becomes complete.

When uplink switching is used, there is a connection to each respective base station (serving cell or target cell) between time periods 0 ms to 60 ms and 100 ms to 140 ms in the uplink of the serving cell, and between time periods 60 ms to 100 ms, and 140 ms to 360 ms in the uplink of the target cell. In other words, in the uplinks the mobile station is connected to the serving cell between 0 ms and 60 ms, the target cell between 60 ms and 100 ms, the serving cell between 100 ms and 140 ms, and the target cell from 140 ms onwards.

When uplink switching is not used, there is a connection to each respective base station (serving cell or target cell) between time periods 0 ms to 60 ms in the uplink of the serving cell, and from 60 ms onwards in the uplink of the target cell. In other words, when no uplink switching is used, the mobile station is connected to the uplink of the serving cell between 0 ms and 60 ms, and the uplink of the target from 60 ms onwards.

Blocks 1203, 1204 and 1205 represent speech frames which are split between cells.

According to this embodiment, the principle applied is that after the access bursts 511 are sent in the target cell, the mobile station returns to the uplink channel in the serving cell, when uplink switching is being used. Since simultaneous downlink transmission is still used the mobile station is able to receive the Physical Information in block 507, providing it with timing advance information to be used in the target cell. After the reception of the Physical Information the mobile station returns to the uplink channel in the target cell and starts to transmit SABM, as shown in block 513. It is also assumed that the speech frame 1203, not completed in the serving cell, is continued in the target as speech frame 1204, to avoid further speech interrupt. This is possible under the assumption that the behavior of the mobile station is well specified. For example, the behavior of a mobile station (such as how the mobile station, when it has received the Physical Info, immediately interrupts the transmission of a speech frame in the serving cell and continues the transmission of the second half of the speech frame in the serving cell) is unambiguously specified (in the 3GPP specifications) so that the network knows exactly what bursts received in the serving and target cell to combine into a complete speech frame.

The bottom portion of FIG. 12 compares the speech interruption times where uplink switching is used, and whereby uplink switching is not used.

When uplink switching is not used, the uplink has speech interruption times comprising an interruption period 1221 of 120 ms in duration between 80 ms and 200 ms and an interruption period 1223 of 20 ms in duration between 340 ms and 360 ms, resulting in a total speech interruption time of 140 ms. However, when uplink switching is used, the uplink has speech interruption times comprising an interruption period 1215 of 60 ms in duration between 80 ms and 140 ms, interruption period 1217 of 20 ms in duration between 180 ms and 200 ms, and interruption period 1219 of 20 ms in duration between 340 ms and 360 ms, resulting in a total speech interruption period of 100 ms.

It can therefore be seen that the speech interruption time is reduced from 140 ms to 100 ms by applying the additional uplink switching. This is accomplished due to the ability to send speech between times 140 ms and 180 ms in FIG. 12. By using uplink switching, the mobile station is able to transmit up to two additional speech frames, one in the serving cell (starting at t=100 ms when the mobile station has switched back to the serving cell after sending access bursts in the target cell) and one speech frame split between the serving and target cell (starting at t=120 ms). Without uplink switching, the mobile station would only be able to transmit in the target cell during this time, but would not be allowed to send any uplink speech frames before SABM is sent.

It is noted that, according to this embodiment, no further restrictions in switching times are imposed, compared to the same combination of CC and STM when not using uplink switching. In other words, the use of uplink switching enables a reduction of 40 ms in speech interruption time, without imposing any further restrictions to switching times.

The uplink switching can be used when no timing advance signal is provided for the target cell, and thus it is required by the mobile station to send access bursts for the network to estimate the timing advance to be used, and communicating this to the mobile station in the physical information.

Figure 13:
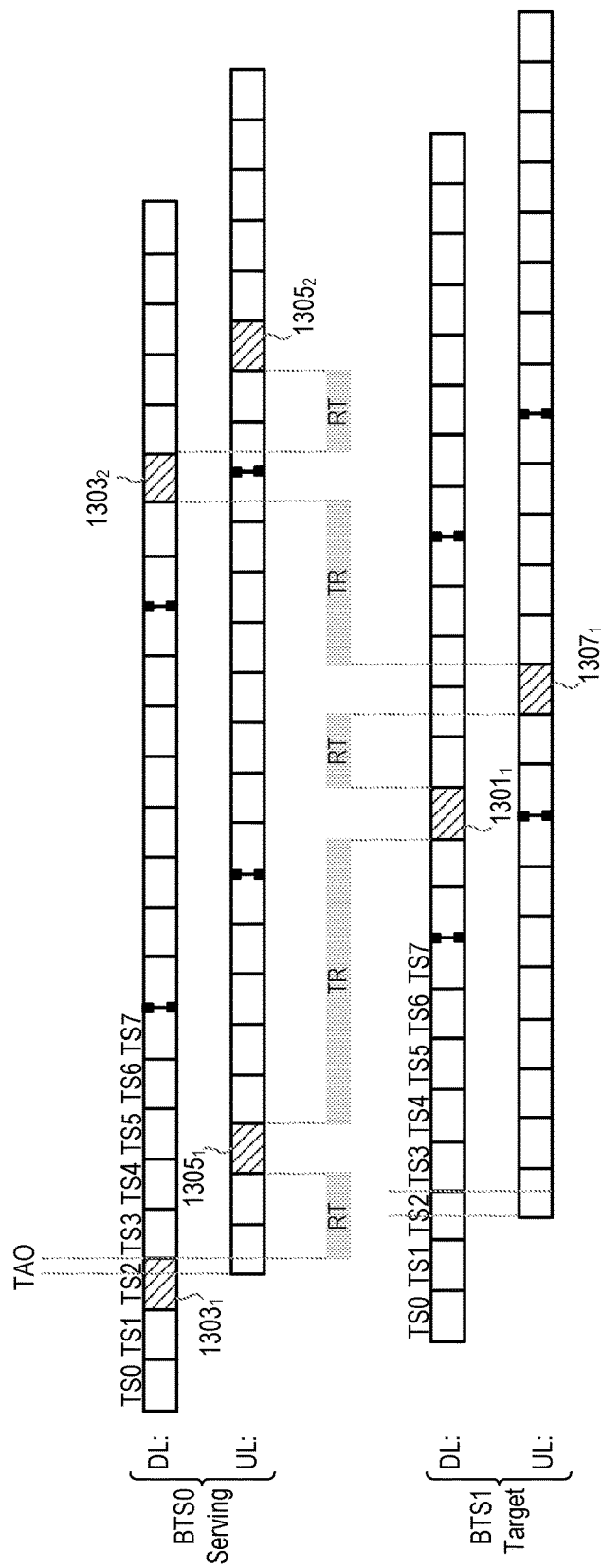
FIG. 13 shows an example of a transmission and reception schedule and switching times according to an embodiment.

With reference to FIG. 13, an application of an embodiment will now be described with reference to a scenario whereby the channel combination mode relates to a half rate traffic channel being provided in both the serving cell and the target cell (defined as channel combination mode CC4 in Table 3 above), and whereby a simultaneous transmission mode is used in both the uplink and downlink (defined as simultaneous transmission mode STM3 in Table 4 above), i.e. a combination of CC4 and STM3.

As mentioned earlier, the importance of the time alignment between the frame structures of the different base stations is that it shall not result in required switching times smaller than the specified switching time of the mobile station (either the current switching times, or a newly defined switching time for this specific feature, as described above).

In the example of FIG. 13 the transmission/reception schedule and corresponding switching times for this particular scenario are illustrated. In the example there are eight timeslots between frame borders, with time slot TS2 being assigned as a circuit switched voice time slot.

Since this embodiment uses half rate on both the serving and target cells, the maximum switching times are less restrictive on this embodiment, for example compared to the embodiment of FIG. 8, whereby:

RT corresponds to the maximum switching time between reception and transmission (Rx→Tx), e.g. between Rx slot $1303_1$ being received by a mobile station on the downlink from the serving cell and Tx slot $1305_1$ being transmitted from a mobile station on the uplink to the serving cell, or between Rx slot $1301_1$ being received by a mobile station on the downlink from the target cell and Tx slot $1307_1$ being transmitted from a mobile station on the uplink to the target cell;

TR corresponds to the maximum switching time between transmission and reception (Tx→Rx), e.g. between Tx slot $1305_1$ being transmitted by a mobile station on the uplink to the serving cell and Rx slot $1301_1$ being received by a mobile station on the downlink of the target cell.

In this specific example the only additional switching times compared to the current requirements (as described in FIG. 6) are the switching times labeled TR, corresponding to the maximum switching time between transmission and reception. These switching times relate to switching between the serving and target base stations.

If it is assumed that only the currently defined switching times are used, and that the mobile station supports a $T_{rb}=1$, then it holds that the maximum switching time TR is greater than or equal to approximately 93 symbols (i.e. TR≥93 symbol periods). This is derived from the burst duration and the maximum timing advance required to be handled by a mobile station by the specifications (see 3GPP TS 45.002, Release 11, version 11.3.0). For example, 156,25 (burst duration)−63 (max TA)≈93 normal symbols.

Figure 14:
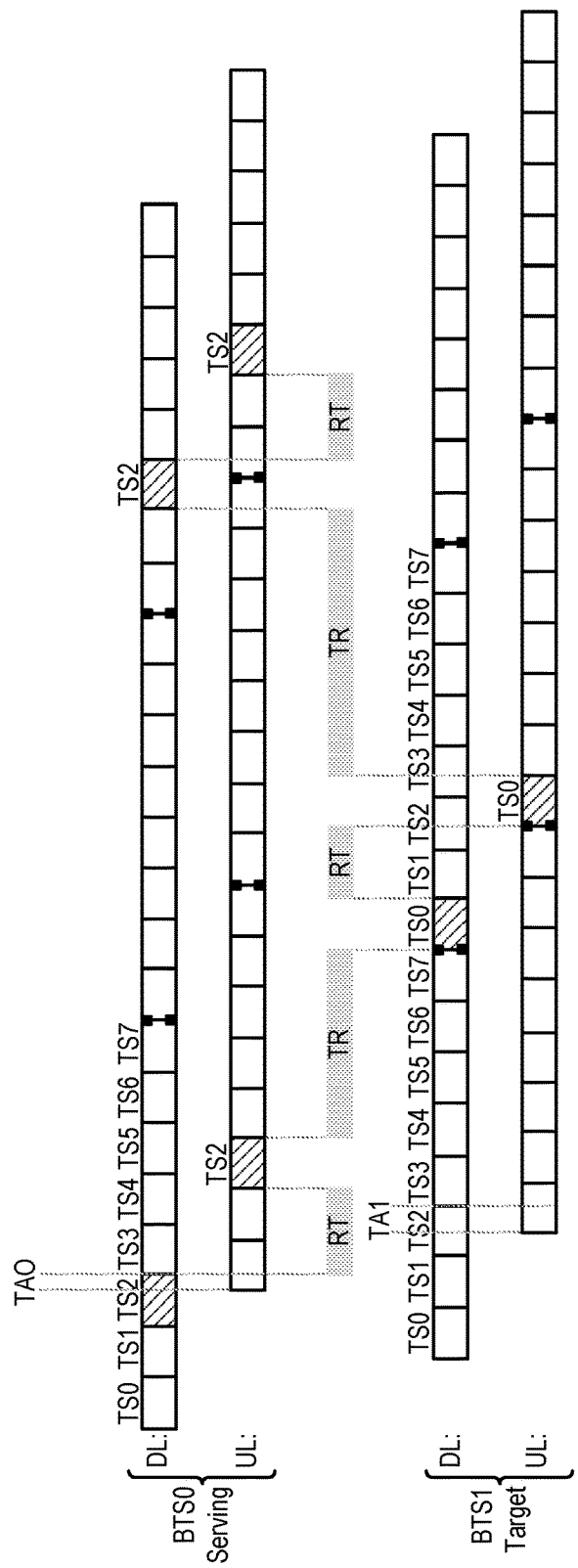
FIG. 14 shows an example of a transmission and reception schedule and switching times according to an embodiment.

It is noted that, since there are options for a network to assign resources in the target base station, FIG. 14 shows an embodiment similar to FIG. 13 (in which the combination of CC4 and STM3 is used), and whereby the use of the same half rate sub-channel is used, but whereby time slot TS0 is assigned for the target cell rather than time slot TS2 as provided in the serving cell.

Figure 15:
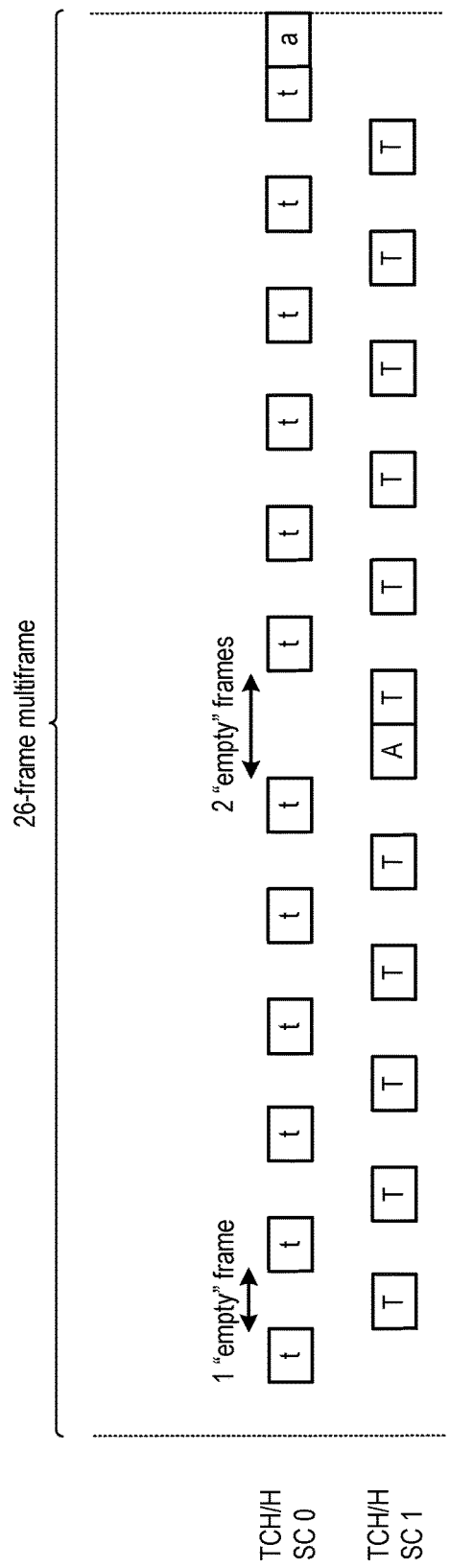
FIG. 15 illustrates an example of empty frames.

It can be noted that FIGS. 12, 13 and 14 only cover three TDMA frames as an example. As was seen in FIGS. 3a and 3b of the background section, the relationship between the two half rate sub channels in a multiframe is not constant (for example the alternating use of TDMA frames is violated when transmitting the associated control channel). However, provided the slow associated control signaling channel is not used during the handover procedure, there will always be at least one TDMA frame between each time slot used where no transmission/reception occurs, referred to herein as an "empty" TDMA frame, as illustrated in FIG. 15.

Since the above figures assume one "empty" frame, and the requirements on switching time are relaxed if more than one empty frame occurs, the figures are valid in all TDMA frames during the 26-frame multiframe in half rate operation.

Figure 16:
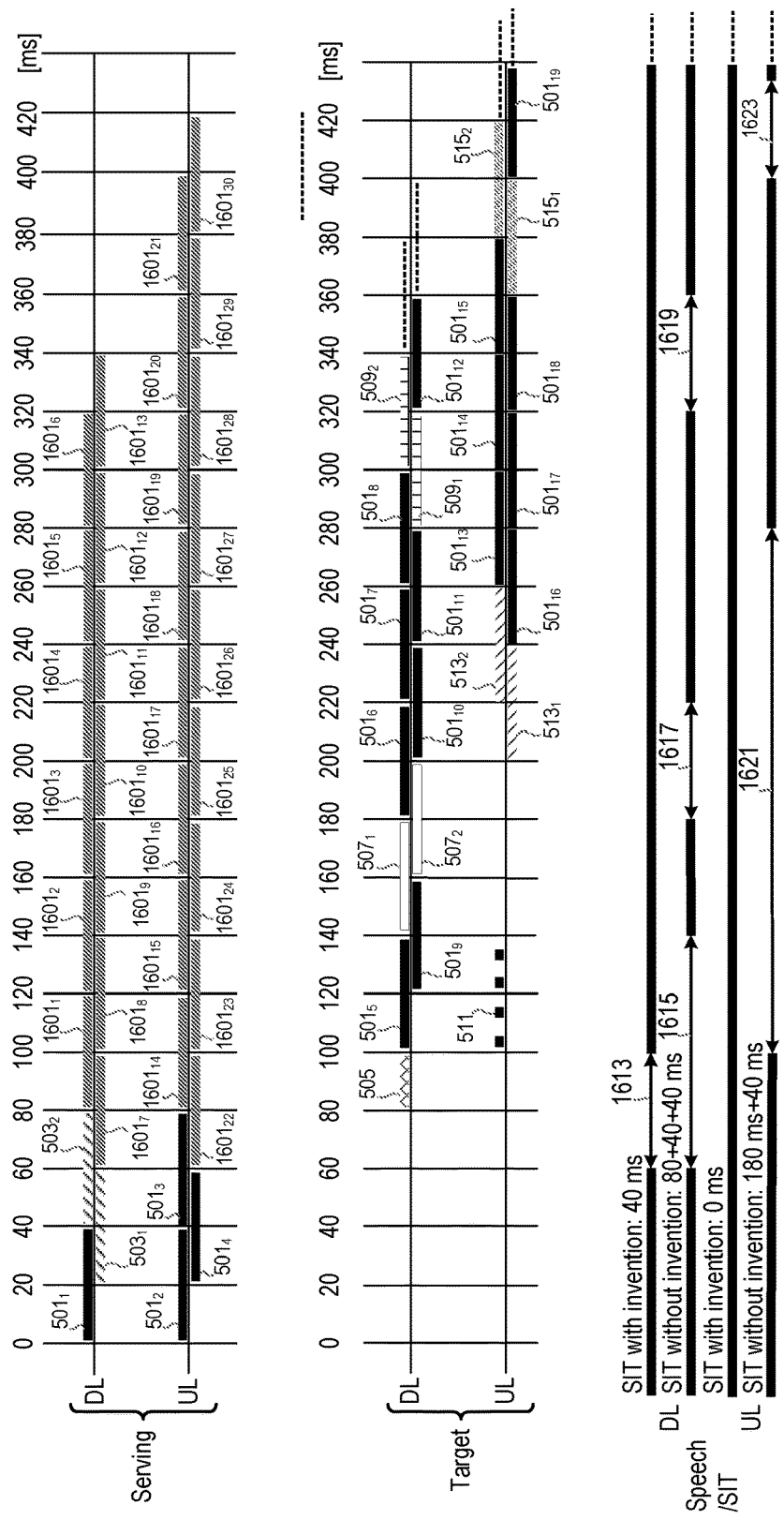
FIG. 16 illustrates speech interruption times according to an embodiment, in an example having half rate and a non-synchronised handover procedure.

It is noted that the half rate embodiment of FIGS. 13 and 14 (for combination CC4 and STM3) results in speech interruption time (SIT) as shown in FIG. 16.

The upper portion of FIG. 16 shows the transmissions that take place in the downlink and uplink of the serving cell. Block $501_1$ represents speech frames that are used to send speech to the mobile station in a downlink from the serving cell, while blocks $501_2$ to $501_4$ represent speech frames received at the serving cell in an uplink from the mobile station. Blocks $503_1$ and $503_2$ relate to time frames during which the handover command is sent on the downlink to the mobile station, for instructing the mobile station to perform a handover operation from the serving cell to the target cell. It is noted that, on a half rate channel, the coded speech frame has only half the number of bits compared to a speech frame on a full rate channel (232 vs 464 bits). The FACCH used to transmit the handover command, on the other hand, has the same number of bits on both channel types (464 bits). Therefore, on a half rate channel, two speech frames must be stolen to transmit a FACCH (as shown above in Table 2), thus requiring the two blocks $503_1$ and $503_2$, (which is effectively one FACCH that has the duration of two speech frames).

Blocks $1601_1$ to $1601_{13}$ represent additional speech frames which are possible to transmit on the downlink of the serving cell due to this embodiment, while blocks $1601_{14}$ to $1601_{30}$ represent additional speech frames which are possible to transmit on the uplink of the serving cell due to this embodiment.

The middle portion of FIG. 16 shows the transmissions that take place in the downlink and uplink of the target cell. Blocks $501_5$ to $501_{12}$ relate to speech frames during which speech can be sent from the target cell to the mobile station on a downlink. Block 505 relates to a time period during which the mobile station is to switch to a new channel and synchronize to a new frame structure (this time being variable, but assumed to be 20 ms in this example). Blocks $507_1$ and $507_2$ relate to frames during which physical information can be sent from the target cell on the downlink, while blocks $509_1$ and $509_2$ relate to frames for sending an unnumbered acknowledgement (UA) on the downlink. Blocks $507_1/507_2$ and $509_1/509_2$ require the duration of two speech frames for the same reasons as those explained above for blocks $503_1$ and $503_2$.

With regard to the uplink to the target cell, block 511 relates to a frame during which four consecutive access bursts are transmitted from a mobile station. Blocks $501_{13}$ to $501_{19}$ relate to speech frames received at the target cell in the uplink from the mobile station. Blocks $513_1$ and $513_2$ relate to the frames used for receiving the set asynchronous balanced mode (SABM) information sent from the mobile station on the uplink to the target cell. Blocks $515_1$ and $515_2$ relate to the frames where the handover operation becomes complete.

From the above it can be seen that additional speech frames $1601_1$ to $1601_{30}$ are made available to transmit on the downlink and uplink of the serving cell.

In the lower portion of FIG. 16 there is shown a comparison of speech interruption times (SIT), both for the uplink and downlink (and illustrated both with and without this embodiment), showing the improvement to the speech interruption times.

In the downlink, the embodiment results in a speech interruption time comprising an interruption period 1613 of 40 ms in duration between 60 ms and 100 ms (compared to a interruption period 1615 of 80 ms, interruption period 1617 of 40 ms and interruption period 1619 of 40 ms without this embodiment). Therefore, according to this embodiment the total speech interruption time on the downlink comprises 40 ms, compared to a total speech interruption time of 160 ms without the invention. For similar reasons to that explained above, this improvement is made possible by simultaneous reception in both cells to allow the mobile station to continuously receive speech frames, except when the handover command itself ($503_1$, $503_2$) is being received in the serving cell.

In the uplink, according to this embodiment it can be seen that there is no speech interruption time (compared to a interruption periods 1621 of 180 ms duration and interruption period 1623 of 40 ms during without the invention, which results in a total speech interruption time of 220 ms without this embodiment of the invention). This improvement is made possible by simultaneous transmission in both cells to allow the mobile station to continuously transmit speech frames.

According to another aspect, the frame structure may be shifted in order to alleviate the demands on the switching times described in the embodiments above.

As has been seen in the Figures above, the switching requirements on the mobile station will be highly dependent on the channel combination CC and the simultaneous transmission mode STM which is used in a particular embodiment. To allow for some further relaxation of the switching time requirement, according to another embodiment a temporary shift of the frame structure, either in the target or serving cell, can be used. It is assumed that no users are assigned these resources.

Figure 17:
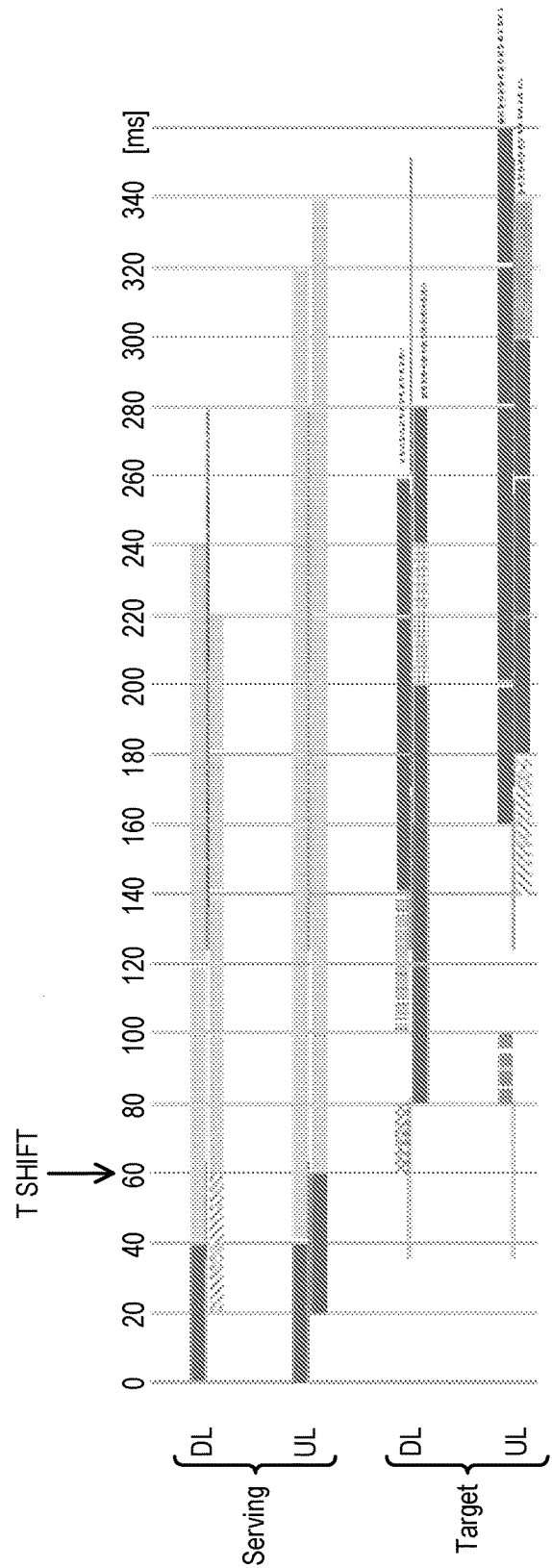
FIG. 17 shows an application of a time shift in an example of an embodiment.

In the example of an embodiment shown in FIG. 17, (which corresponds to the embodiment described above in FIG. 10), the temporary shift in the frame structure is applied to the serving cell. According to one embodiment the use of the temporary frame structure shift, and/or the magnitude of the shift, is indicated in the handover command. Thus, the time from when the shift in frame structure applies would correspond to when the handover command has been received at time $T_{SHIFT}$ shown in FIG. 17 (after time 60 ms in the example). It is noted, however, that this information may be conveyed in some other way, without departing from the scope of the invention as defined in the appended claims.

Figure 18:
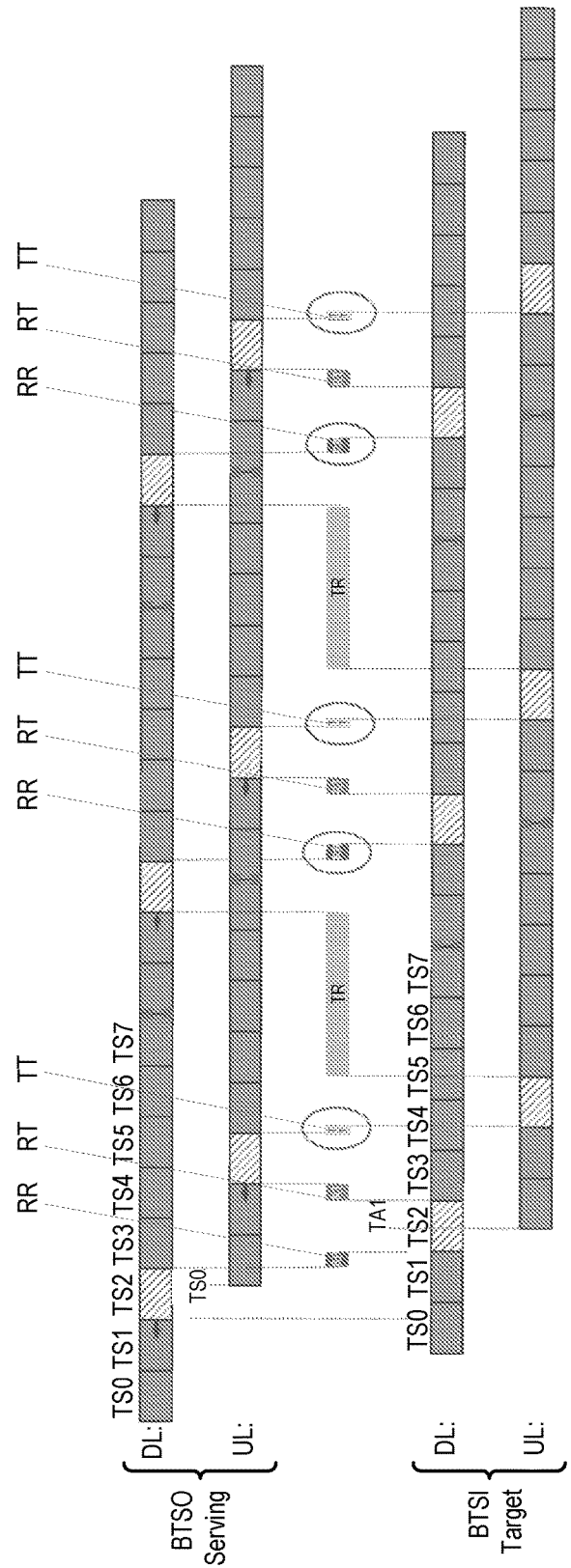
FIG. 18 illustrates the impact on switching times due to time shifting of frame structure according to FIG. 17.

Referring to FIG. 18, this shows how the temporary shift in frame structure is applied to the serving cell. If it is assumed that no user is assigned the resources on TS1 in the serving cell, the network can indicate to the mobile station assigned TS2 to advance the frame structure a certain number of symbols (shown by the arrows) in order to alleviate the switching requirements between the serving and target base stations (indicated by the switching times that have been circled in FIG. 18). As such, the switching times that have been circled are relaxed compared to the switching times without such a time shift. It is noted that such a time shift may be applied to any of the embodiments described herein.

It is also noted that although the embodiments above have been described in detail in connection with certain channel combinations (CCs) and simultaneous transmission modes (STMs), it is noted that other combinations are possible to use, each resulting in different requirements on switching times.

It will be appreciated that the information of interest in all these cases, both for the telecommunication specifications and standards, and network implementation details, is the minimum acceptable switching times of the mobile station. Given a certain channel combination CC, simultaneous transmission mode STM, acceptable mobile station switching time, real time difference RTD, timing advance signal TA0, and timing advance signal TA1, a network node according to embodiments of the invention is able to act and use the new handover procedure on the set of resources that the above conditions allow.

Table 6 below provides a summary of the impact to speech interruption times (SIT) due to the example embodiments described above (in the case of a non-synchronized handover).

TABLE 6

| Channel combi-nation | Simultaneous transmission mode | SIT without invention [ms] | | SIT with invention [ms] | | Improvement [ms] | |
|---|---|---|---|---|---|---|---|
| | | DL | UL | DL | UL | DL | UL |
| CC1 | STM2 | 100 | 140 | 100 | 0 | 0 | 140 |
| CC1 | STM3 | 100 | 140 | 20 | 0 | 80 | 140 |
| CC4 | STM3 | 160 | 220 | 40 | 0 | 120 | 220 |

Table 7 shows the speech disturbance times (SDT), which is defined as the time from the start of the first speech interruption to the end of the last speech interruption (again for example embodiments using non-synchronized handover).

TABLE 7

| Channel combi-nation | Simultaneous transmission mode | SDT without invention [ms] | | SDT with invention [ms] | | Improvement [ms] | |
|---|---|---|---|---|---|---|---|
| | | DL | UL | DL | UL | DL | UL |
| CC1 | STM2 | 200 | 280 | 200 | 0 | 0 | 260 |
| CC1 | STM3 | 200 | 280 | 20 | 0 | 180 | 260 |
| CC4 | STM3 | 300 | 340 | 40 | 0 | 260 | 340 |

The comparisons above have been carried out using the non-synchronized handover as a baseline for comparison. There are however, as mentioned earlier in the application, handover procedures that rely on knowledge of network synchronization, where both speech interruption and speech disturbance is diminished compared to the non-synchronized handover case.

Figure 19:
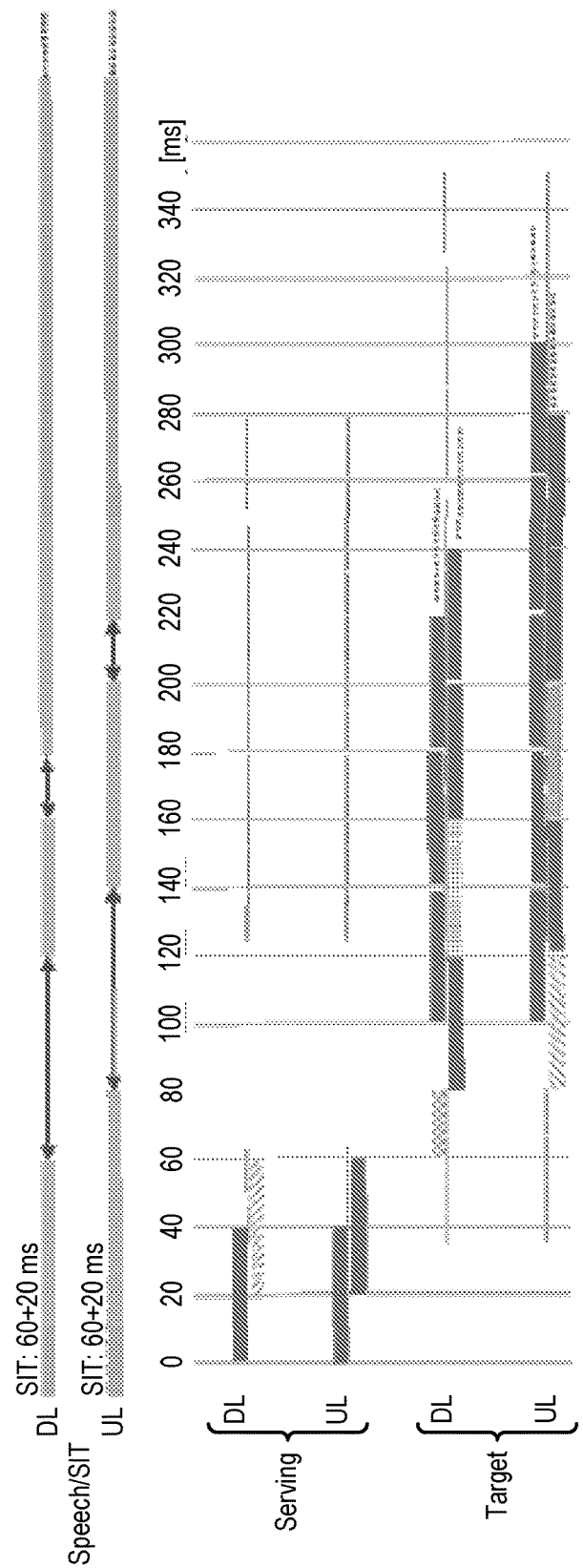
FIG. 19 illustrates speech interruption times in an arrangement having full rate channels and a synchronized handover procedure.

In Tables 8 and 9 below, the embodiments are compared to the case of synchronized handover. It is assumed that the optional transmission of four access bursts are not sent by the mobile station when accessing the new cell (this is currently optional behavior according to the specifications, as described in technical specification 3GPP TS 44.018, Release 11, version 11.6.0, if indicated so by the network, and is thus assumed to be a best case scenario). Further details of the synchronized handover procedure for the FR/FR case can be seen in FIG. 19 for a channel combination corresponding to CC1 (i.e. FR/FR), and FIG. 20 for a channel combination corresponding to CC4 (i.e. HR/HR).

It can be seen from the Tables that there are still substantial gains with the embodiments when compared to synchronized handover (even in the best case assumption when the mobile station does not transmit access burst to the network).

TABLE 8

| Channel combination | Simultaneous transmission mode | SIT without invention [ms] | | SIT with invention [ms] | | Improvement [ms] | |
|---|---|---|---|---|---|---|---|
| | | DL | UL | DL | UL | DL | UL |
| CC1 | STM2 | 80 | 80 | 80 | 0 | 0 | 80 |
| CC1 | STM3 | 80 | 80 | 20 | 0 | 60 | 80 |
| CC4 | STM3 | 120 | 220 | 40 | 0 | 80 | 220 |

TABLE 9

| Channel combination | Simultaneous transmission mode | SDT without invention [ms] | | SDT with invention [ms] | | Improvement [ms] | |
|---|---|---|---|---|---|---|---|
| | | DL | UL | DL | UL | DL | UL |
| CC1 | STM2 | 120 | 140 | 120 | 0 | 0 | 140 |
| CC1 | STM3 | 120 | 140 | 20 | 0 | 100 | 140 |
| CC4 | STM3 | 180 | 200 | 40 | 0 | 140 | 200 |

It will be noted from the above that a mobile station may be simultaneously connected to both a serving cell and a target cell according to the embodiments. When receiving the same data on two different channels (for example, speech frames transmitted by the base stations in the serving and target cells), the receiver of a mobile station according to the embodiments has several options on how to combine the data streams. According to one embodiment, the mobile station is configured to select one of the streams. According to another embodiment, the mobile station is configured to use various soft combining techniques. It is noted that the embodiments are not limited to any particular combining technique.

According to another aspect, an indication of a mobile station's capability to support seamless handover (and potentially new related radio access specific capabilities, for example new multislot class) can be conveyed in different ways according to the embodiments. According to one embodiment an indication is added to the Classmark Information Element of a mobile station, and/or to the Radio Access Capability Information Element of the mobile station (further details of these elements being described in technical specification 3GPP TS 24.008, Release 11, version 11.8.0).

The embodiments, when supporting a seamless handover, may be adapted to provide the following information:
an indication of the supported switching class (if more than one switching class is specified, and if the current multislot classes are not re-used for the seamless handover);
an indication of the simultaneous transmission mode(s), as described in Table 4 above.

It is noted that the embodiments described above do not affect the overall handover procedures, thus having the advantage of enabling the embodiments to be used with legacy systems. A handover command message can indicate to a mobile station that a seamless handover is to be executed, providing resources in the target cell which comply with the switching class and simultaneous transmission mode supported by the mobile station. It is noted that the signaling can either be stand-alone or combined with current signaling, for example with signaling relating to handover type, e.g. a pre-synchronized handover with seamless handover functionality.

The mobile station can be adapted to establish the main signaling link on the resources indicated in the handover command message, with the target cell using legacy procedure and messages while continue to transmit and receive the user plane from the source (serving) cell. The mobile station can be adapted to stop using the uplink resources to the source (serving) cell once it has successfully sent the handover complete message to the target cell.

If a temporary frame structure shift is used as described above, this can be indicated, for example, in the handover command, together with the magnitude of the shift.

The embodiments described above have the advantage of reducing or eliminating handover speech interruption times in an uplink, downlink or both.

According to an embodiment, a network node (such as a base station and/or a base station controller) can be configured to determine which CC and STM combination is being applied, and then determine what network resources are available for that particular combination (e.g. which time slots are free to be used for speech), so that the MS and BTSs between them can schedule where the additional speech frames will be sent.

For example, a base station controller can be configured to determine the CC, the STM and the network resources to use in the target cell by analyzing a combination of one or more of the factors, for example one or more of:
the mode (FR or HR) of the current connection (in the serving cell)
the desired mode (FR or HR) in the target cell (which could e.g. be restricted to FR due to low signal strength to the target cell, or to HR due to high traffic load in the target cell, or restricted due to other operator settings).
The switching time capabilities of the mobile station
The available resources (timeslots+frequencies) in the target cell
The relative timing of the two cells and the mobile station (OTD, t0, t1)

The additional speech frames would be sent on the current channel (in the serving cell), which are not used for something else in prior art. The uplink of that channel would be empty in prior art (until the channel is reused by another mobile station, but that would typically not happen until the handover is complete). The downlink would in the prior art either be empty, or the network would continue to transmit speech frames until the handover is complete, as a precaution in case the mobile failed to receive the handover command (or the handover fails for some other reason).

It is noted that although the embodiments described above have been made in relation to speech frames and other signals having certain durations, for example 20 ms durations, it is noted that these are merely examples, and that other durations can be used.

Figure 20:
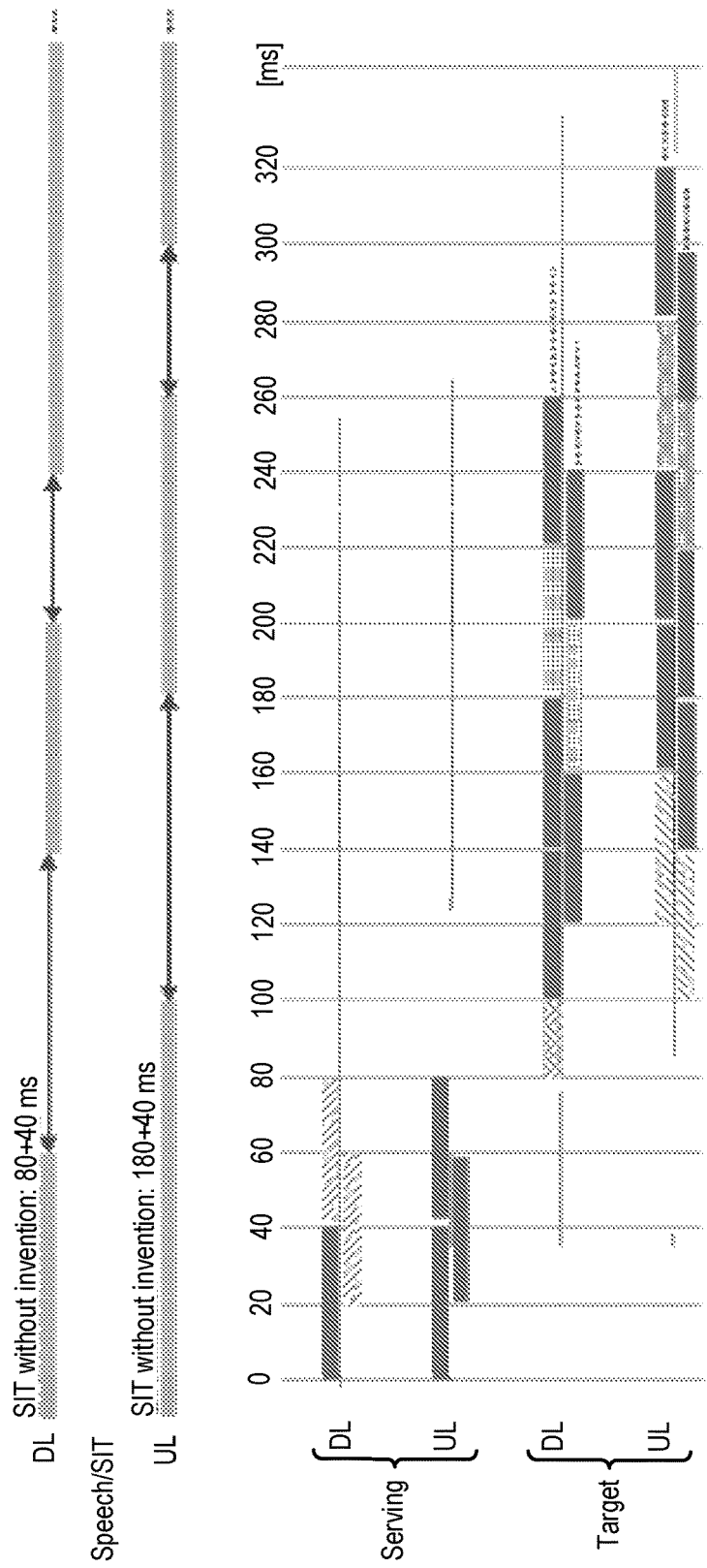
FIG. 20 illustrates speech interruption times in an arrangement having half rate channels and a synchronized handover procedure.

In order to help illustrate the improvements to speech interruption times according to the embodiments described above, FIG. 19 illustrates speech interruption without use of the invention, in an example having full rate channels and a synchronized handover procedure, while FIG. 20 also illustrates speech interruption times without use of the invention, in an example having half rate channels and a synchronized handover procedure.

For the avoidance of doubt, in addition to the embodiments described above, it is noted that the subject matter of the present invention is intended to embrace the following subject matter contained in the following numbered paragraphs (abbreviated as "para")

Para 1. There is provided a method for improving handover in a mobile station configured to operate a time division multiple access, TDMA, protocol in a global system for mobile communications, GSM, telecommunication network, the method comprising the steps of: receiving a handover command requesting that the mobile station perform a handover operation from a serving cell to a target cell (701); and configuring the mobile station to transmit and receive user plane data with the serving cell and the target cell during a time period between receiving the handover command and the handover operation being completed (703).

Para 2. There is provided a method as defined in para 1, further comprising the steps of adapting a TDMA transmission schedule such that a physical layer of the mobile station is configured to alternate between transmission and/or reception to/from the serving cell and target cell, while continuing to interchange signalling messages with the serving cell and target cell.

Para 3. There is provided a method as defined in para 1, further comprising the steps of communicate speech data simultaneously with the serving cell and the target cell after receipt of a handover command, and prior to a handover operation being completed.

Para 4. There is provided a method as defined in para 3, wherein the step of communicating simultaneously comprises the steps of alternately receiving from the serving cell, transmitting to the serving cell, receiving from the target cell, and transmitting to the target cell.

Para 5. There is provided a method as defined in any one of the preceding paras, further comprising the steps of: establishing a set of channel combinations, each channel combination relating to whether a traffic channel is operating in a full rate mode or half rate mode of communication; establishing a set of simultaneous transmission modes, each simultaneous transmission mode relating to whether simultaneous communication is only provided in a downlink to the mobile station, only in an uplink from the mobile station, or in both downlink and uplink directions; and scheduling the transmission and reception of TDMA timeslots based on which combination of channel combination mode and simultaneous transmission mode is selected.

Para 6. There is provided a method as defined in any one of the preceding paras, further comprising the step of transmitting user data to a target cell after communicating set asynchronous balanced mode, SABM, information.

Para 7. There is provided a method as defined in any one of the preceding paras, further comprising the step of temporarily shifting a frame structure of either the serving cell or target cell relative to one another by a selectable number of symbols.

Para 8. There is provided a method as defined in para 7, wherein a frame structure shift signal and information relating to the magnitude of shift are received with the handover command.

Para 9. There is provided a method as defined in any one of the preceding paras, further comprising the step of performing uplink switching between a serving cell and a target cell.

Para 10. There is provided a method as defined in any one of the preceding paras, further comprising the steps of combining data streams received simultaneously, or selecting one of the data streams received simultaneously, or using soft combining techniques.

Para 11. There is provided a method as defined in any one of the preceding paras, further comprising the step of establishing a main signaling link on the resources indicated in the handover command message, whilst a target cell is using legacy procedures and messages, and continuing to transmit and receive data on the user plane from the serving cell.

Para 12. There is provided a method as defined in para 11, further comprising the step of ceasing to use the uplink resources to the serving cell once the mobile station has successfully sent a handover complete message to the target cell.

Para 13. There is provided a method as defined in any one of paras 1 to 12, further comprising the step of transmitting an indication to a network node relating to the switching class or switching classes the mobile station supports.

Para 14. There is provided a method as defined in para 13, wherein the mobile station is forbidden to send access bursts during the handover procedure.

Para 15. There is provided a method as defined in para 1, further comprising the steps of continuing to transmit one or more speech frames in the serving cell until the mobile station is allowed to transmit speech frames in the target cell.

Para 16. There is provided a method as defined in para 1, further comprising the steps of performing uplink switching to transmit up to two additional speech frames, one in the serving cell relating to when the mobile station has switched back to the serving cell after sending access bursts in the target cell, and one speech frame split between the serving and target cell.

Para 17. There is provided a method for improvising handover in a mobile station the method comprising the steps of: receiving a handover command requesting that the mobile station perform a handover operation from a serving cell to a target cell; and configuring the mobile station to transmit and receive user plane data with the serving cell and the target cell during a time period between receiving the handover command and the handover operation being completed.

Para 18. There is provided a mobile station (7100) configured to operate a time division multiple access, TDMA, protocol in a global system for mobile communications, GSM, telecommunication network, the mobile station comprising: an interface unit (7101) configured to receive a handover command requesting that the mobile station perform a handover operation from a serving cell to a target cell; and a processing unit (7103) configured to control transmission and reception of user plane data with the serving cell and the target cell during a time period between receiving the handover command and the handover operation being completed.

Para 19. There is provided a mobile station as defined in para 18, wherein the mobile station is configured to adapt a TDMA transmission schedule such that a physical layer of the mobile station is configured to alternate between transmission and/or reception to/from the serving cell and target cell, while continuing to interchange signalling messages with the serving cell and target cell.

Para 20. There is provided a mobile station as defined in para 18, wherein the mobile station is configured to communicate speech data simultaneously with the serving cell and the target cell after receipt of a handover command, and prior to a handover operation being completed.

Para 21. There is provided a mobile station as defined in para 20, wherein the mobile station is configured to communicate simultaneously by alternately receiving from the serving cell, transmitting to the serving cell, receiving from the target cell, and transmitting to the target cell.

Para 22. There is provided a mobile station as defined in para 18, wherein the mobile station is configured to: establish a set of channel combinations, each channel combination relating to whether a traffic channel is operating in a full rate mode or half rate mode of communication; establish a set of simultaneous transmission modes, each simultaneous transmission mode relating to whether simultaneous communication is only provided in a downlink to the mobile station, only in an uplink from the mobile station, or in both downlink and uplink directions; and schedule the transmission and reception of TDMA timeslots based on which combination of channel combination mode and simultaneous transmission mode is selected.

Para 23. There is provided a mobile station as defined in any one of paras 18 to 22, wherein the mobile station is configured to transmit user data to a target cell after communicating set asynchronous balanced mode, SABM, information.

Para 24. There is provided a mobile station as defined in any one of paras 18 to 23, wherein the mobile station is configured to temporarily shift a frame structure of either the serving cell or target cell relative to one another by a selectable number of symbols.

Para 25. There is provided a mobile station as defined in para 24, wherein a frame structure shift signal and information relating to the magnitude of shift are received with the handover command.

Para 26. There is provided a mobile station as defined in any one of paras 18 to 25, wherein the mobile station is configured to perform uplink switching between a serving cell and a target cell.

Para 27. There is provided a mobile station as defined in any one of paras 18 to 26, wherein a receiver of a mobile station is adapted to combine data streams received simultaneously, or select one of the data streams received simultaneously, or use soft combining techniques.

Para 28. There is provided a mobile station as defined in para 18, wherein the mobile station is configured to adapt establish a main signaling link on the resources indicated in the handover command message, whilst a target cell is using legacy procedures and messages, the mobile station being adapted to continue transmitting and receiving data on the user plane from the serving cell.

Para 29. There is provided a mobile station as defined in para 18, wherein the mobile station is configured to adapt use the uplink resources to the serving cell once the mobile station has successfully sent a handover complete message to the target cell.

Para 30. There is provided a mobile station as defined in para 18, wherein the mobile station is configured to indicate to a network node the switching class or switching classes the mobile station supports.

Para 31. There is provided a mobile station as defined in para 18, wherein the mobile station is configured to prevent sending access bursts during the handover procedure.

Para 32. There is provided a mobile station as defined in para 18, wherein the mobile station is configured to continue transmitting one or more speech frames in the serving cell until the mobile station is allowed to transmit speech frames in the target cell.

Para 33. There is provided a mobile station as defined in para 18, wherein the mobile station is configured to use uplink switching to transmit up to two additional speech frames, one in the serving cell relating to when the mobile station has switched back to the serving cell after sending access bursts in the target cell, and one speech frame split between the serving and target cell.

Para 34. There is provided a method in a network node that is configured to operate a time division multiple access, TDMA, protocol in a global system for mobile communications, GSM, telecommunication network, the method comprising the steps of: determining which channel combination, CC, and simultaneous transmission mode, STM, is being used to communicate with a mobile station; determining which network resources are available for the combination of CC and STM; and transmitting a handover signal to a mobile station, requesting that the mobile station perform a handover operation from a serving cell to a target cell, the handover signal containing information relating to the resources to be used during the handover for communicating user plane data, such that the mobile station is configurable to transmit and receive user plane data with the serving cell and the target cell during a time period between the handover signal transmitted from the network node being received by the mobile station and the handover operation being completed.

Para 35. There is provided a method as defined in para 34, further comprising the step of determining a frame alignment between the serving cell and the target cell, and allocating resources in the target cell based on the determined frame alignment.

Para 36. There is provided a method as defined in para 35, wherein the step of determining the frame alignment comprises the step of determining a timing difference between frames in a serving cell and frames in a target cell.

Para 37. There is provided a method as defined in any one of paras 34 to 36, wherein the network node is configured to transmit a handover command message to the mobile station which contains an indication that a seamless handover is to be executed, providing resources in the target cell which comply with the switching class and simultaneous transmission mode supported by the mobile station.

Para 38. There is provided a method as defined in any one of paras 1 to 17 or 34 to 37, wherein for each combination of CC or STM, further comprising the steps of establishing a plurality of switching classes, each switching class comprising a set of minimum acceptable switching times corresponding to one or more of: a switching time between one transmission and another transmission; a switching time between a transmission and a reception; a switching time between a reception and a reception; a switching time between a reception and a transmission.

Para 39. There is provided a method as defined in para 38, wherein a switching time is defined as an integer value of a time slot, or a plurality of half-symbol periods, or a plurality of full-symbol periods.

Para 40. There is provided a method as defined in any one of paras 34 to 39, further comprising the steps of determining the CC, the STM and the network resources to use in the target cell by analyzing a combination of one or more of:
    the mode (e.g. FR or HR) of the current connection in the serving cell,
    the desired mode (e.g. FR or HR) in the target cell (which could e.g. be restricted to FR due to low signal strength to the target cell, or to HR due to high traffic load in the target cell, or restricted due to other operator settings)
    the switching time capabilities of the mobile station
    the available resources (e.g. timeslots+frequencies) in the target cell,
    the relative timing of the two cells and the mobile station (e.g. OTD, t0, t1).

Para 41. There is provided a network node (7300) configured to operate a time division multiple access, TDMA, protocol in a global system for mobile communications, GSM, telecommunication network, the network node comprising: a processing unit (7303) configured to: determine which channel combination, CC, and simultaneous transmission mode, STM, is being used by a mobile station; determine which network resources are available for the combination of CC and STM; and an interface unit (7301) configured to transmit a handover signal to a mobile station requesting that the mobile station perform a handover operation from a serving cell to a target cell, the handover signal containing information relating to the resources to be used during the handover for communicating user plane data, such that the mobile station is configurable to transmit and receive user plane data with the serving cell and the target cell during a time period between the handover signal transmitted from the network node being received by the mobile station and the handover operation being completed.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A method for improving handover in a mobile station configured to operate a time division multiple access (TDMA) protocol in a global system for mobile communications (GSM) telecommunication network, the method comprising the steps of:
   receiving a handover command requesting that the mobile station perform a handover operation from a serving cell to a target cell;
   configuring the mobile station to transmit and receive user plane data with the serving cell and the target cell during a time period between receiving the handover command and the handover operation being completed; and
   transmitting user plane data, during the time period, via an uplink connection switched between the serving cell and the target cell, wherein the transmitted user plane data includes:
     a first speech frame transmitted via the serving cell; and
     a second speech frame including a first portion transmitted via the serving cell and a second portion transmitted via the target cell.

2. The method of claim 1, further comprising the steps of adapting a TDMA transmission schedule such that a physical layer of the mobile station is configured to alternate between transmission and/or reception to/from the serving cell and target cell, while continuing to interchange signaling messages with the serving cell and target cell.

3. The method of claim 1, further comprising the steps of communicating speech data simultaneously with the serving cell and the target cell after receipt of a handover command, and prior to a handover operation being completed.

4. The method of claim 3, wherein the step of communicating simultaneously comprises the steps of alternately receiving from the serving cell, transmitting to the serving cell, receiving from the target cell, and transmitting to the target cell.

5. The method of claim 1, further comprising the steps of:
   establishing a set of channel combinations, each channel combination relating to whether a traffic channel is operating in a full rate mode or half rate mode of communication;
   establishing a set of simultaneous transmission modes, each simultaneous transmission mode relating to whether simultaneous communication is only provided in a downlink to the mobile station, only in an uplink from the mobile station, or in both downlink and uplink directions; and
   scheduling the transmission and reception of TDMA timeslots based on which combination of channel combination mode and simultaneous transmission mode is selected.

6. The method of claim 1, further comprising the step of transmitting user data to a target cell after communicating set asynchronous balanced mode (SABM) information.

7. The method of claim 1, further comprising the step of temporarily shifting a frame structure of either the serving cell or target cell relative to one another by a selectable number of symbols.

8. The method of claim 1, wherein the first speech frame is transmitted after transmitting one or more access bursts in the target cell.

9. A mobile station configured to operate a time division multiple access (TDMA) protocol in a global system for mobile communications (GSM) telecommunication network, the mobile station comprising:
   a processing circuit configured to control transmission and reception of user plane data with the serving cell and the target cell during a time period between receiving the handover command and the handover operation being completed; and
   an interface circuit configured to:
     receive a handover command requesting that the mobile station perform a handover operation from a serving cell to a target cell; and
     transmit user plane data, during the time period, via an uplink connection switched between the serving cell and the target cell, wherein the transmitted user plane data includes:
       a first speech frame transmitted via the serving cell; and
       a second speech frame including a first portion transmitted via the serving cell and a second portion transmitted via the target cell.

10. The mobile station of claim 9, wherein the mobile station is configured to adapt a TDMA transmission schedule such that a physical layer of the mobile station is configured to alternate between transmission and/or reception to/from the serving cell and target cell, while continuing to interchange signaling messages with the serving cell and target cell.

11. The mobile station of claim 10, wherein the mobile station is configured to communicate speech data simultaneously with the serving cell and the target cell after receipt of a handover command, and prior to a handover operation being completed.

12. The mobile station of claim 11, wherein the mobile station is configured to communicate simultaneously by alternately receiving from the serving cell, transmitting to the serving cell, receiving from the target cell, and transmitting to the target cell.

13. The mobile station of claim 9, wherein the mobile station is configured to:
   establish a set of channel combinations, each channel combination relating to whether a traffic channel is operating in a full rate mode or half rate mode of communication;
   establish a set of simultaneous transmission modes, each simultaneous transmission mode relating to whether simultaneous communication is only provided in a downlink to the mobile station, only in an uplink from the mobile station, or in both downlink and uplink directions; and schedule the transmission and reception of TDMA timeslots based on which combination of channel combination mode and simultaneous transmission mode is selected.

14. A method in a network node that is configured to operate a time division multiple access (TDMA) protocol in a global system for mobile communications (GSM) telecommunication network, the method comprising the steps of:

determining which channel combination (CC) and simultaneous transmission mode (STM) is being used to communicate with a mobile station;

determining which network resources are available for the combination of CC and STM; and transmitting a handover signal to a mobile station, requesting that the mobile station perform a handover operation from a serving cell to a target cell, the handover signal containing information relating to the resources to be used during the handover for communicating user plane data, such that the mobile station is configurable to transmit and receive user plane data with the serving cell and the target cell during a time period between the handover signal transmitted from the network node being received by the mobile station and the handover operation being completed.

15. The method of claim 14, further comprising the step of determining a frame alignment between the serving cell and the target cell, and allocating resources in the target cell based on the determined frame alignment.

16. The method of claim 14, wherein for each combination of channel combination (CC) or simultaneous transmission mode (STM) the method further comprises the steps of establishing a plurality of switching classes, each switching class comprising a set of minimum acceptable switching times corresponding to one or more of:

a switching time between one transmission and another transmission;

a switching time between a transmission and a reception;

a switching time between a reception and a reception;

a switching time between a reception and a transmission.

17. The method of claim 16, wherein a switching time is defined as an integer value of a time slot, or a plurality of half-symbol periods, or a plurality of full-symbol periods.

18. The method of claim 14, further comprising the steps of determining the CC, the STM and the network resources to use in the target cell by analyzing a combination of one or more of:

the mode of the current connection in the serving cell, the desired mode in the target cell, the switching time capabilities of the mobile station, the available resources in the target cell, the relative timing of the two cells and the mobile station.

19. A network node configured to operate a time division multiple access (TDMA) protocol in a global system for mobile communications (GSM) telecommunication network, the network node comprising:

a processing circuit configured to:

determine which channel combination (CC) and simultaneous transmission mode (STM) is being used by a mobile station;

determine which network resources are available for the combination of CC and STM; and an interface circuit configured to transmit a handover signal to a mobile station requesting that the mobile station perform a handover operation from a serving cell to a target cell, the handover signal containing information relating to the resources to be used during the handover for communicating user plane data, such that the mobile station is configurable to transmit and receive user plane data with the serving cell and the target cell during a time period between the handover signal transmitted from the network node being received by the mobile station and the handover operation being completed.

* * * * *